United States Patent
Harada et al.

(10) Patent No.: US 11,488,427 B2
(45) Date of Patent: Nov. 1, 2022

(54) AUTHENTICATION METHOD FOR AUTHENTICATING THAT TARGET VEHICLE IS VEHICLE OF WHICH DISPATCH HAS BEEN RESERVED IN DISPATCH SYSTEM, STORAGE MEDIUM, SERVER, AND DISPATCH SYSTEM

(71) Applicant: Panasonic Intellectual Property Corporation of America, Torrance, CA (US)

(72) Inventors: Naoyuki Harada, Osaka (JP); Hideo Umetani, Osaka (JP); Shuhei Matsui, Osaka (JP); Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 316 days.

(21) Appl. No.: 16/149,382

(22) Filed: Oct. 2, 2018

(65) Prior Publication Data

US 2019/0139344 A1 May 9, 2019

(30) Foreign Application Priority Data

Nov. 8, 2017 (JP) .............................. JP2017-215771

(51) Int. Cl.
*G06Q 30/06* (2012.01)
*G06Q 50/26* (2012.01)
(Continued)

(52) U.S. Cl.
CPC .......... *G07C 9/00309* (2013.01); *B60R 25/01* (2013.01); *B60R 25/20* (2013.01);
(Continued)

(58) Field of Classification Search
CPC .. G06Q 30/0645; G06Q 50/265; G06Q 10/02; G07C 9/00309; G07C 2009/00388;
(Continued)

(56) References Cited

U.S. PATENT DOCUMENTS 9,771,018 B2 * 9/2017 Fournier ................. B60R 25/25
10,384,597 B1 * 8/2019 Kemler ................ G05D 1/0088
(Continued)

FOREIGN PATENT DOCUMENTS

CH 695401 A5 4/2006
CN 107653532 A * 2/2018
(Continued)

OTHER PUBLICATIONS

Wu, To taxi or not to Taxi (Year: 2012).*
(Continued)

*Primary Examiner* — Sangeeta Bahl
(74) *Attorney, Agent, or Firm* — Greenblum & Bernstein, P.L.C.

(57) ABSTRACT

An authentication method includes: receiving, from a terminal of a user, a user ID for identifying the user and a target vehicle ID for identifying a target vehicle that the user tries to authenticate; determining whether the target vehicle ID matches a reserved vehicle ID for identifying a reserved vehicle whose dispatch has been reserved by the user; in a case where the target vehicle ID matches the reserved vehicle ID, transmitting, to the target vehicle, an unlocking instruction to unlock a door of the target vehicle and causing the terminal to present a message indicating that the user is allowed to get on the target vehicle; and in a case where the target vehicle ID does not match the reserved vehicle ID, causing the terminal to present a message indicating that the target vehicle is not the reserved vehicle of the user.

9 Claims, 14 Drawing Sheets

(51) Int. Cl.
*G07C 9/00* (2020.01)
*G07B 15/02* (2011.01)
*B60R 25/01* (2013.01)
*B60R 25/20* (2013.01)
*G08G 1/00* (2006.01)

(52) U.S. Cl.
CPC ..... *B60R 25/2018* (2013.01); *G06Q 30/0645* (2013.01); *G06Q 50/265* (2013.01); *G07B 15/02* (2013.01); *G08G 1/205* (2013.01); *B60R 2325/205* (2013.01); *G07C 2009/00388* (2013.01)

(58) Field of Classification Search
CPC ..... B60R 25/2018; B60R 25/01; B60R 25/20; B60R 2325/205; G08G 1/205; G07B 15/02
USPC ............................................................ 705/325
See application file for complete search history.

(56) References Cited

U.S. PATENT DOCUMENTS

| | | | | |
|---|---|---|---|---|
| 10,431,071 | B2* | 10/2019 | Zhang | G06F 3/00 |
| 2011/0112969 | A1* | 5/2011 | Zaid | G06Q 10/02 |
| | | | | 705/50 |
| 2012/0203599 | A1* | 8/2012 | Choi | G06Q 30/02 |
| | | | | 705/13 |
| 2013/0317693 | A1* | 11/2013 | Jefferies | G07B 15/00 |
| | | | | 701/31.5 |
| 2014/0051465 | A1* | 2/2014 | Ruys | G01C 21/3676 |
| | | | | 455/457 |
| 2016/0232719 | A1* | 8/2016 | Brinig | G07B 15/02 |
| 2017/0127215 | A1* | 5/2017 | Khan | H04W 12/64 |
| 2017/0294130 | A1* | 10/2017 | Donnelly | H04W 12/50 |
| 2018/0039917 | A1* | 2/2018 | Buttolo | B60W 60/00253 |
| 2018/0136655 | A1* | 5/2018 | Kim | B60N 2/002 |
| 2018/0320419 | A1 | 11/2018 | Haugede et al. | |

FOREIGN PATENT DOCUMENTS

| | | |
|---|---|---|
| EP | 1868857 B1 | 10/2008 |
| FR | 3043039 A1 | 5/2017 |
| JP | 2012-215922 A | 11/2012 |
| JP | 2015-230690 | 12/2015 |
| JP | 2016-064830 | 4/2016 |

OTHER PUBLICATIONS

The Extended European Search Report dated Mar. 28, 2019 for the related European Patent Application No. 18204374.5.
Communication pursuant to Article 94(3) EPC dated Aug. 12, 2020 for the related European Patent Application No. 18204374.5.

* cited by examiner

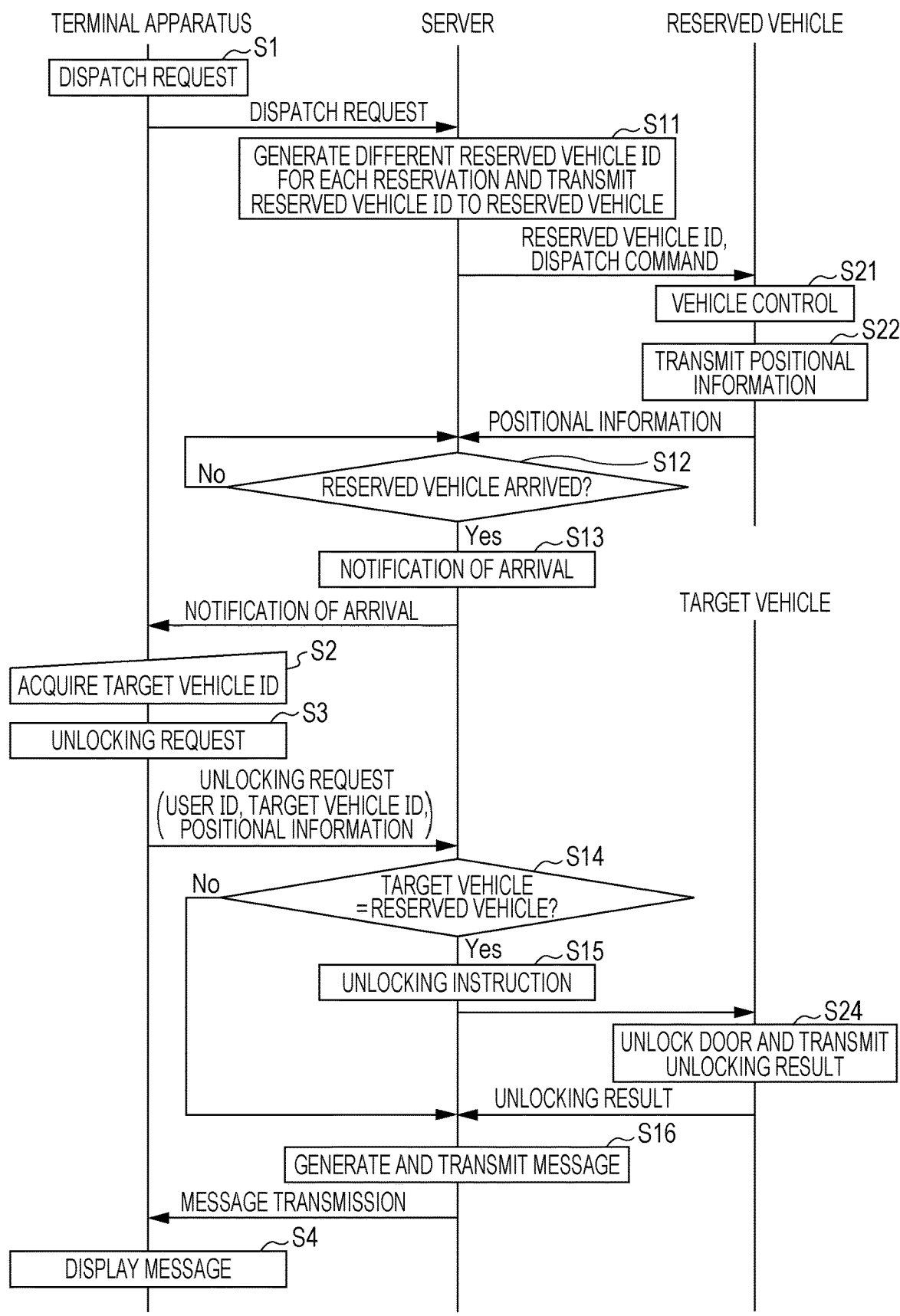

FIG. 4A

| USER ID | MANAGED VEHICLE ID | INFORMATION INDICATING BOARDING POINT |
|---|---|---|
| A | 11-11 | (135.5,34.5) |
| B | 22-22 | (135.6,34.4) |
| ... | ... | ... |

FIG. 4B

| MANAGED VEHICLE ID | POSITIONAL INFORMATION | INFORMATION INDICATING DIRECTION OF TRAVEL |
|---|---|---|
| 11-11 | (135.5,34.5) | 90 deg |
| 22-22 | (135.6,34.4) | 90 deg |
| ... | ... | ... |

# AUTHENTICATION METHOD FOR AUTHENTICATING THAT TARGET VEHICLE IS VEHICLE OF WHICH DISPATCH HAS BEEN RESERVED IN DISPATCH SYSTEM, STORAGE MEDIUM, SERVER, AND DISPATCH SYSTEM

BACKGROUND

1. Technical Field

The present disclosure relates to an authentication method, a storage medium, a server, and a dispatch system.

2. Description of the Related Art

In recent years, along with the emergence of self-guided vehicles, a dispatch system has been developed in which users reserve vehicles such as self-guided driverless taxis. In such a dispatch system, there are imaginable situations such as a situation where a user may get into danger of being abducted by a vehicle disguising as the vehicle the user has reserved or a situation where the user may be unjustifiably charged, for example, by being made unable to undo the lock unless he/she pays the exorbitantly high price in getting off the vehicle. Further, in the dispatch system, there is an imaginable situation where someone other than the user may, without asking, steal a ride in the vehicle the user has reserved. To address these problems, the dispatch system needs to be a system in which everyone can, for example, make a reservation for a self-guided driverless taxi with safety and security.

Japanese Unexamined Patent Application Publication No. 2016-64830 discloses an automobile in which a first authenticator determines, with reference to first authentication information of a user and biological information of pre-registered prospective users, whether the user is authenticatable. Moreover, when the first authenticator has successfully authenticated the user, a decider makes a decision to enable the user to use the automobile.

Further, Japanese Unexamined Patent Application Publication No. 2015-230690 discloses a vehicle confirmation system in which a message is displayed on a display situated on board a taxi. Further, in the vehicle confirmation system, this message is transmitted to a terminal apparatus via a server, and the terminal apparatus displays the message thus received. This allows a user to recognize that he/she may get on the taxi.

SUMMARY

In one general aspect, the techniques disclosed here feature an authentication method including: receiving, from a terminal of a user, a user ID for identifying the user and a target vehicle ID for identifying a target vehicle that the user tries to authenticate; determining, with reference to dispatch information, whether the target vehicle ID matches a reserved vehicle ID for identifying a reserved vehicle whose dispatch has been reserved by the user, wherein, in the dispatch information, a plurality of reserved vehicle IDs for identifying reserved vehicles whose dispatches have been reserved are in association with a plurality of user IDs for identifying users who have reserved vehicle dispatches, respectively; in a case where the target vehicle ID matches the reserved vehicle ID, transmitting, to the target vehicle, an unlocking instruction to unlock a door of the target vehicle and causing the terminal to present a message indicating that the user is allowed to get on the target vehicle; and in a case where the target vehicle ID does not match the reserved vehicle ID, causing the terminal to present a message indicating that the target vehicle is not the reserved vehicle of the user.

It should be noted that general or specific embodiments may be implemented as a system, an apparatus, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a sequence diagram showing an operation of the dispatch system according to Embodiment 1;

FIGS. 4A and 4B illustrate diagrams showing dispatch information and vehicle information, respectively, according to Embodiment 1;

DETAILED DESCRIPTION

Figure 1:
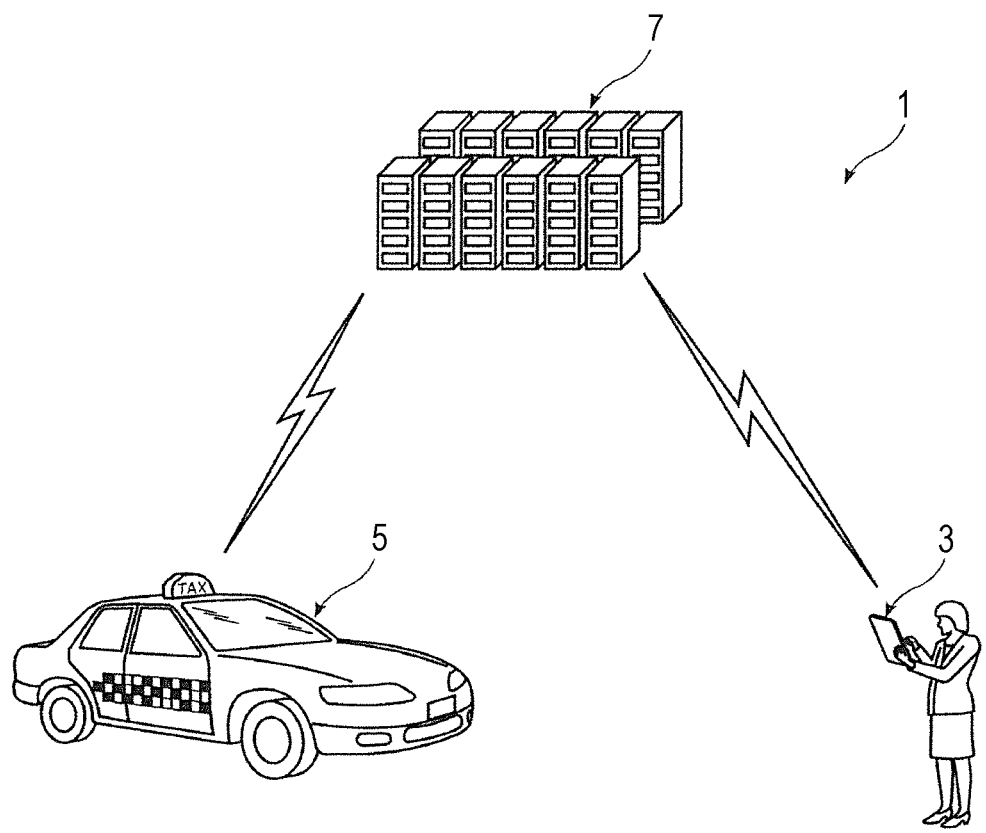
FIG. 1 is a schematic view showing a dispatch system according to Embodiment 1.

Underlying Knowledge Forming Basis of the Present Disclosure

There has been a demand for authentication of a vehicle through a simple procedure with enhanced safety of a user in the user's getting on the vehicle. This requires the user to authenticate the vehicle and the vehicle to authenticate the user. For this reason, a combination of the automobile disclosed in Japanese Unexamined Patent Application Publication No. 2016-64830 and the vehicle confirmation system disclosed in Japanese Unexamined Patent Application Publication No. 2015-230690 makes it possible to enhance the safety of the user by performing authentication on the vehicle side and authentication on the user side."

However, a mere combination of the automobile disclosed in Japanese Unexamined Patent Application Publication No. 2016-64830 and the vehicle confirmation system disclosed in Japanese Unexamined Patent Application Publication No. 2015-230690 makes it necessary that after the user has authenticated through a mobile terminal whether he/she may get on the vehicle, the vehicle determine, on the basis of biological information of the user, whether the user may get on the vehicle. This makes it hard to say that the user can authenticate the vehicle through a simple procedure in getting on the vehicle.

To address these problems, the present disclosure provides an authentication method, a program, a server, and a dispatch system that make it possible to enhance the safety of a user and easily authenticate a vehicle.

BRIEF OVERVIEW OF EMBODIMENTS

An authentication method according to an aspect of the present disclosure is an authentication method by which in a dispatch system that dispatches a reserved vehicle that a user has reserved, a server authenticates the user and a target vehicle that has arrived at the user's side. The server receives, from a terminal apparatus owned by the user, a user ID that identifies the user and a target vehicle ID that identifies the target vehicle. The server determines, with reference to dispatch information by which the user ID that identifies the user who has reserved a vehicle dispatch and a reserved vehicle ID that identifies the reserved vehicle are managed in association with each other, whether the reserved ID vehicle associated with the user ID and the target vehicle ID match. In a case where the reserved vehicle ID and the target vehicle ID match, the server transmits, to the target vehicle, an unlocking instruction to unlock a door of the target vehicle, generates a message indicating that the user is allowed to get on the target vehicle, and transmits the message to the terminal apparatus. In a case where the reserved vehicle ID and the target vehicle ID do not match, the server generates a message indicating that the target vehicle is not the reserved vehicle, and transmits the message to the terminal apparatus.

According to this, for example, by the user simply using the terminal apparatus to read the target vehicle ID of the target vehicle that has arrived at the user's side, the target vehicle ID thus read is transmitted to the server. The server determines, with reference to dispatch information by which the user ID that identifies the user who has reserved a vehicle dispatch and a reserved vehicle ID that identifies the reserved vehicle are managed in association with each other, whether the reserved ID vehicle associated with the user ID and the target vehicle ID match, thereby determining whether the target vehicle is the reserved vehicle. In a case where the target vehicle is the reserved vehicle, the server transmits, to the reserved vehicle, an unlocking instruction to unlock a door of the reserved vehicle, generates a message indicating that the user may get on the reserved vehicle, and transmits the message to the terminal apparatus. On the other hand, in a case where the target vehicle is not the reserved vehicle, the server generates a message indicating that the target vehicle is not the reserved vehicle, and transmits the message to the terminal apparatus. This allows the user to judge, for example, whether the user may get on the reserved vehicle or whether the user must not get on the vehicle. For example, the security of vehicle authentication can be enhanced by reducing the occurrence of trouble such as a situation where a user gets into danger of, for example, being abducted, a situation where the user is unjustifiably charged by being made unable to undo the lock unless he/she pays the exorbitantly high price in getting off the vehicle, or a situation where someone other than the user steals a ride in the reserved vehicle without asking. This makes it possible to enhance the safety of the user.

Further, referring to the dispatch information allows the server to determine, through the reserved vehicle ID and the target vehicle ID, the reserved vehicle that the user should get on and to determine, through the user ID, the user that the reserved vehicle allows to get on it. For this reason, by the user simply reading the target vehicle ID of the target vehicle that has arrived at the user's side, the server is enabled to perform mutual authentication of the target vehicle and the terminal apparatus of the user. That is, the server performs mutual authentication by allowing the user to authenticate the target vehicle through the terminal apparatus and allowing the target vehicle to authenticate whether the target vehicle may allow the user to get on it. This makes it easy for the user to perform authentication.

Accordingly, this vehicle authentication method makes it possible to enhance the safety of the user and easily perform vehicle authentication. Since the server easily performs vehicle authentication, the user rides in the reserved vehicle for a shorter period of time. This makes it possible to improve the efficiency of operation of the dispatch system including at least the reserved vehicle and the terminal apparatus. This makes it possible to achieve a reduction in hourly unit cost of the dispatch system. As a result, an increase in efficiency of the dispatch system as a whole can be achieved.

Further, a program according to an aspect of the present disclosure causes a computer to execute the authentication method.

Further, a server according to an aspect of the present disclosure is a server which, in a dispatch system that dispatches a reserved vehicle that a user has reserved, authenticates the user and a target vehicle that has arrived at the user's side, including: a communicator that receives, from a terminal apparatus owned by the user, a user ID that identifies the user and a target vehicle ID that identifies the target vehicle; a determiner that determines, with reference to dispatch information by which the user ID that identifies the user who has reserved a vehicle dispatch and a reserved vehicle ID that identifies the reserved vehicle are managed in association with each other, whether the reserved ID vehicle associated with the user ID and the target vehicle ID match; and a message generator that generates a message for the terminal apparatus to display and outputs the message to the terminal apparatus, wherein in a case where the reserved vehicle ID and the target vehicle ID match, the message generator transmits, to the target vehicle, an unlocking instruction to unlock a door of the target vehicle, generates a message indicating that the user is allowed to get on the target vehicle, and transmits the message to the terminal apparatus, and in a case where the reserved vehicle ID and the target vehicle ID do not match, the message generator generates a message indicating that the target vehicle is not the reserved vehicle, and transmits the message to the terminal apparatus.

Further, a dispatch system according to an aspect of the present disclosure includes: a terminal apparatus; a reserved vehicle that a user has reserved, and a server that authenticates the user and a target vehicle that has arrived at the user's side. The terminal apparatus acquires, from the target vehicle, a target vehicle ID that identifies the target vehicle, and transmits, to the server, a user ID that identifies the user and the target vehicle ID. The server determines, with reference to dispatch information by which the user ID that identifies the user who has reserved a vehicle dispatch and a reserved vehicle ID that identifies the reserved vehicle are managed in association with each other, whether the reserved ID vehicle associated with the user ID and the target vehicle ID match. In a case where the reserved vehicle ID and the target vehicle ID match, the server transmits, to the target vehicle, an unlocking instruction to unlock a door of the target vehicle, generates a message indicating that the user is allowed to get on the target vehicle, and transmits the message to the terminal apparatus. In a case where the reserved vehicle ID and the target vehicle ID do not match, the server generates a message indicating that the target vehicle is not the reserved vehicle, and transmits the message to the terminal apparatus.

These bring about the working effects as those mentioned above.

The authentication method according to an aspect of the present disclosure is configured such that the server manages vehicle information containing a plurality of managed vehicle IDs that identify a plurality of vehicles, including the reserved vehicle, that the server manages, that in a case where the reserved vehicle ID and the target vehicle ID do not match, the server determines whether the target vehicle ID is contained in the vehicle information, and that in a case where the target vehicle ID is not contained in the vehicle information, the server generates a message indicating a cancellation of a ride into the target vehicle and transmits the message to the terminal apparatus.

According to this, in a case where the reserved vehicle ID and the target vehicle ID do not match, the server determines whether the target vehicle ID is contained in the vehicle information that the server manages. In a case where the target vehicle ID is not contained in the vehicle information, it is conceivable that the target vehicle is not a vehicle that the server manages. Therefore, the server generates a message indicating the cancellation of a ride into the target vehicle, which may be a malicious vehicle or the like having an evil intention of, for example, abducting the user or unjustifiably charging the user, for example, by making the user unable to undo the lock unless he/she pays the exorbitantly high price in getting off the vehicle, and transmits the message to the terminal apparatus. This causes the terminal apparatus to display the message indicating the cancellation of a ride into the target vehicle. This in turn makes it possible to more surely reduce the occurrence of trouble such as the abduction of the user by a malicious vehicle.

By stopping the user from getting on a malicious vehicle, the server makes it possible to reduce wasteful dispatch of the reserved vehicle by the server, thus making it possible to curb a reduction in efficiency of operation of the dispatch system.

The authentication method according to an aspect of the present disclosure is configured such that in a case where the target vehicle ID is contained in the vehicle information, the server receives positional information of the reserved vehicle and positional information of the target vehicle and determines whether a distance between a position indicated by the positional information of the reserved vehicle and a position indicated by the positional information of the target vehicle is equal to or shorter than a first prescribed distance and that if the distance is equal to or shorter than the first prescribed distance, the server generates a message that prompts the user to look around, and transmits the message to the terminal apparatus.

According to this, in a case where the target vehicle ID is contained in the vehicle information, the server receives the positional information of the reserved vehicle and the positional information of the target vehicle and determines whether the distance between the position indicated by the positional information of the reserved vehicle and the position indicated by the positional information of the target vehicle is equal to or shorter than the first prescribed distance. If the distance is equal to or shorter than the first prescribed distance, the server generates a message that prompts the user to look around, and transmits the message to the terminal apparatus. For this reason, since the terminal apparatus displays a message that prompts the user to look around, the user can recognize that the reserved vehicle is present in an area around him/her. This makes it possible to save the user the trouble of looking for the reserved vehicle.

This makes it possible to shorten the time it takes for the user to find the reserved vehicle, thus making it possible to improve the efficiency of operation of the dispatch system.

In particular, the terminal apparatus displays a message, indicating a specific relative position, that prompts the user to look around, such as "opposite lane" or "50 m behind". This allows the user to recognize the specific position of the reserved vehicle, thus making it possible to greatly save the user the trouble of looking for the reserved vehicle.

The authentication method according to an aspect of the present disclosure is configured such that in a case where the target vehicle ID is contained in the vehicle information, the server receives positional information of the reserved vehicle and positional information of the target vehicle and determines whether a distance between a position indicated by the positional information of the reserved vehicle and a position indicated by the positional information of the target vehicle is equal to or shorter than a first prescribed distance and that if the distance is not equal to or shorter than the first prescribed distance, the server changes, to the position indicated by the positional information of the target vehicle, a position to which the reserved vehicle is dispatched, generates a message that prompts the user to wait, and transmits the message to the terminal apparatus.

According to this, in a case where the target vehicle ID is contained in the vehicle information, the server receives the positional information of the reserved vehicle and the positional information of the target vehicle and determines whether the distance between the position indicated by the positional information of the reserved vehicle and the position indicated by the positional information of the target vehicle is equal to or shorter than the first prescribed distance. If the distance is not equal to or shorter than the first prescribed distance, the server changes, to the position indicated by the positional information of the target vehicle, the position to which the reserved vehicle is dispatched, generates a message that prompts the user to wait, and transmits the message to the terminal apparatus. This allows the server to dispatch the reserved vehicle down in front of the user. This makes it possible to save the user the trouble of looking for the reserved vehicle.

This makes it possible to shorten the time it takes for the user to find the reserved vehicle, thus making it possible to improve the efficiency of operation of the dispatch system.

The authentication method according to an aspect of the present disclosure is configured such that in a case where the reserved vehicle ID and the target vehicle ID match, the server further receives positional information of the terminal apparatus and determines whether a distance between a position indicated by the positional information of the terminal apparatus and the position indicated by the positional information of the reserved vehicle is equal to or shorter than a second prescribed distance and that if the distance is not equal to or shorter than the second prescribed distance, the server generates a message indicating a cancellation of a ride into the target vehicle and transmits the message to the terminal apparatus.

According to this, in a case where the reserved vehicle ID and the target vehicle ID match, the server receives the positional information of the terminal apparatus and determines whether the distance between the position indicated by the positional information of the terminal apparatus and the position indicated by the positional information of the target vehicle is equal to or shorter than the second prescribed distance. If the distance is not equal to or shorter than the second prescribed distance, the server generates a message indicating the cancellation of a ride into the target vehicle and transmits the message to the terminal apparatus. For example, in a case where the reserved vehicle is not located near the user, a target vehicle other than the reserved vehicle may arrive at the user's side. In this case, it is conceivable that the target vehicle may be a malicious vehicle having an evil intention of, for example, abducting the user or unjustifiably charging the user, for example, by making the user unable to undo the lock unless he/she pays the exorbitantly high price in getting off the vehicle. For this reason, the server transmits, to the terminal apparatus, a message indicating to the user that the target vehicle is a malicious vehicle, whereby the terminal apparatus displays a message indicating the cancellation of a ride into the target vehicle, which is a malicious vehicle. This allows the user to recognize that the target vehicle is not the reserved vehicle but a malicious vehicle.

Alternatively, if the distance is equal to or shorter than the second prescribed distance, the server generates a message indicating that the user may get on the target vehicle and transmits the message to the terminal apparatus. For example, in a case where the reserved vehicle is located near, e.g. in front of, the user, the server transmits, to the terminal apparatus, a message indicating the arrival of the reserved vehicle, whereby the terminal apparatus displays a message indicating that the target vehicle is the reserved vehicle, i.e. that the user may get on the target vehicle.

This in turn makes it possible to more surely reduce the occurrence of trouble such as the abduction of the user by a malicious vehicle.

Further, by stopping the user from getting on a malicious vehicle, the server can make the user get on the reserved vehicle. This makes it possible to more surely perform mutual authentication of the target vehicle and the terminal apparatus of the user and reduce wasteful dispatch of the reserved vehicle by the server, thus making it possible to curb a reduction in efficiency of operation of the dispatch system.

The authentication method according to an aspect of the present disclosure is configured such that the server generates a different reserved vehicle ID for each reservation, transmits the reserved vehicle ID thus generated to the reserved vehicle, and causes the reserved vehicle to update the reserved vehicle ID so that it is replaced by the new reserved vehicle ID thus received.

According to this, the server generates a different reserved vehicle ID for each reservation, transmits the reserved vehicle ID thus generated to the reserved vehicle, and causes the reserved vehicle to update the reserved vehicle ID so that it is replaced by the new reserved vehicle ID thus received. For this reason, since the server changes reserved vehicle IDs each time the server performs a dispatch, it becomes difficult for a malicious vehicle having an evil intension of, for example, abducting the user to easily forge a reserved vehicle ID. This makes it possible to more surely reduce the occurrence of trouble such as the abduction of the user by a malicious vehicle.

Further, by more surely reducing the occurrence of trouble such as the abduction of the user by a malicious vehicle, the server can make the user get on the reserved vehicle. This makes it possible to more surely perform mutual authentication of the target vehicle and the terminal apparatus of the user and reduce wasteful dispatch of the reserved vehicle by the server, thus making it possible to curb a reduction in efficiency of operation of the dispatch system.

It should be noted that general or specific embodiments may be implemented as a system, an apparatus, a method, an integrated circuit, a computer program, a computer-readable storage medium such as a CD-ROM, or any selective combination thereof.

The following describes embodiments in concrete terms with reference to the drawings. It should be noted that each of the embodiments to be described below shows a specific example of the present disclosure. The numerical values, the shapes, the materials, the constituent elements, the placement positions and connection forms of the constituent elements, the steps, the orders of the steps, and the like that are shown in the following embodiments are mere examples and are not intended to limit the present disclosure. Further, those of the constituent elements in the following embodiments which are not recited in an independent claim representing the most generic concept are described as optional constituent elements.

It should be noted that each drawing is not necessarily strictly illustrated. Further, each drawing gives the same reference numerals to substantially the same components so that a repeated description may be omitted or simplified.

The following describes authentication methods, programs, terminal apparatuses, and dispatch systems according to embodiments of the present disclosure.

Embodiment 1

Configuration

First, a configuration of a dispatch system 1 according to Embodiment 1 is described.

Figure 2:
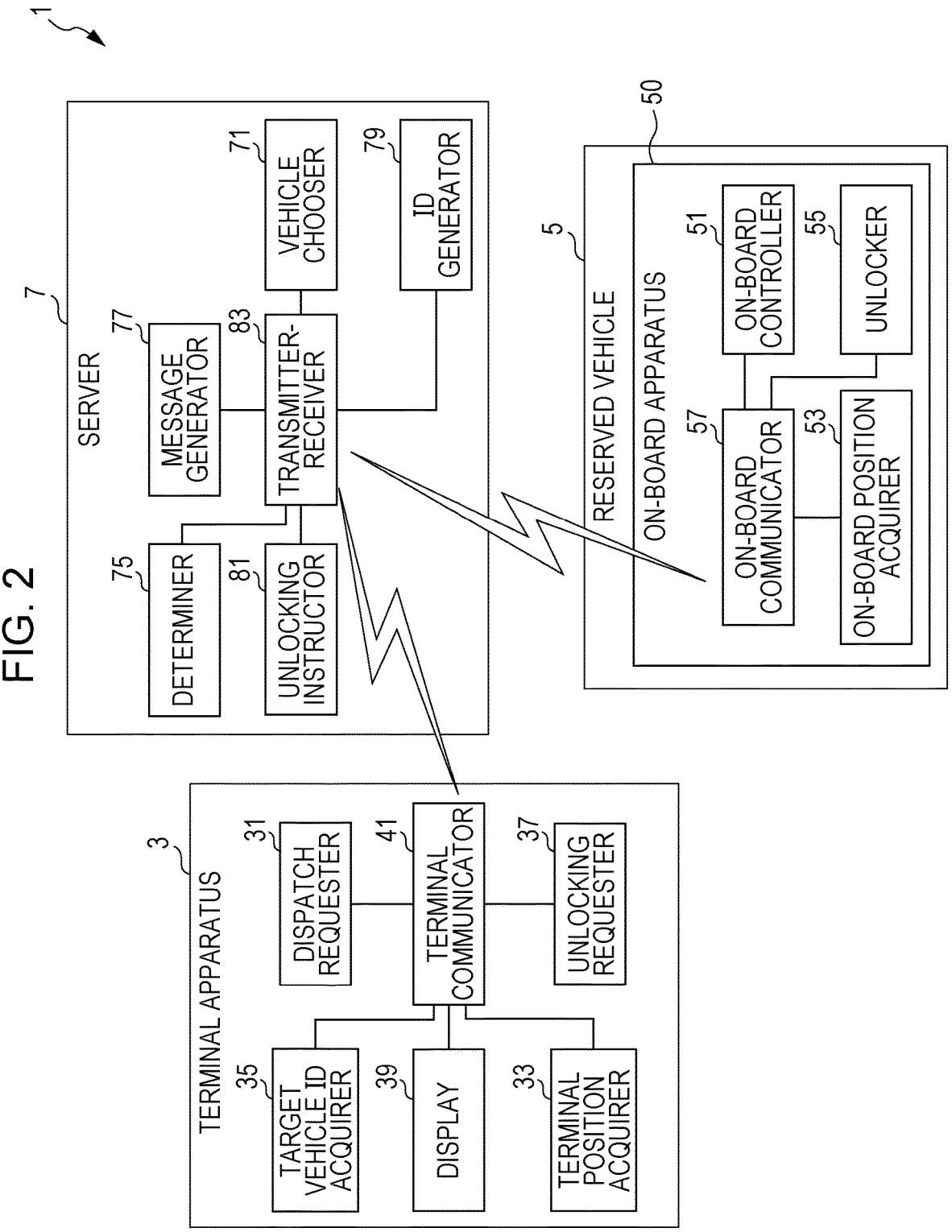
FIG. 2 is a block diagram showing the dispatch system according to Embodiment 1.

FIG. 1 is a schematic view showing the dispatch system 1 according to Embodiment 1. FIG. 2 is a block diagram showing the dispatch system 1 according to Embodiment 1.

As shown in FIGS. 1 and 2, the dispatch system 1 is a dispatch system that dispatches a reserved vehicle 5 that a user has reserved. In this system, a server 7 authenticates the user and a target vehicle that has arrived at the user's side. For example, the system dispatches, to a designated place, the reserved vehicle 5 that the user has reserved through the server 7. For example, the server 7 of the dispatch system 1 is a taxi management system, a taxi reservation system, or the like that dispatches taxis. In the dispatch system 1, the reserved vehicle 5, a terminal apparatus 3 owned by the user who has reserved a taxi, and the server 7 communicate information to one another.

The term "target vehicle" here means a vehicle that has arrived at the user's side. This vehicle serves for the user to authenticate through the terminal apparatus 3 whether he/she can get on the vehicle.

The dispatch system 1 includes the terminal apparatus 3, the reserved vehicle 5, and the server 7.

The terminal apparatus 3 is a terminal apparatus that the user uses in making a reservation for a vehicle dispatch through the server 7. For example, the terminal apparatus 3 is a smartphone, a tablet terminal, or the like. The terminal apparatus 3 includes a dispatch requester 31, a terminal position acquirer 33, a target vehicle ID acquirer 35, an unlocking requester 37, a display 39, and a terminal communicator 41.

The dispatch requester 31 makes a dispatch request to the server 7 via the terminal communicator 41 when the user makes a dispatch request, which is a reservation for a vehicle dispatch, to the server 7. In making a dispatch request to the server 7, the dispatch requester 31 may transmit a user ID for authenticating the user to the server 7 via the terminal communicator 41. The user ID is an identifier of the user who makes a reservation for a vehicle dispatch.

The terminal position acquirer 33 is an element and a processor that acquire positional information indicating the present position of the terminal apparatus 3. The terminal position acquirer 33 transmits the positional information thus acquired indicating the present position of the terminal apparatus 3 to the server 7 via the terminal communicator 41. The terminal position acquirer 33 is realized, for example, by a function such as a GPS. The positional information indicating the present position of the terminal apparatus 3 is positional information of the terminal apparatus 3.

The target vehicle ID acquirer 35 acquires, from the target vehicle, a target vehicle ID that identifies the target vehicle. Specifically, by reading, with a camera of the like of the terminal apparatus 3, a license plate, a one-dimensional code, a QR code (registered trademark), or a two-dimensional code such as a color code shown on the target vehicle, the target vehicle ID acquirer 35 acquires a target vehicle ID, held by the target vehicle, that is used to identify whether the target vehicle is the reserved vehicle 5. The target vehicle ID acquirer 35 may receive the target vehicle ID via the terminal communicator 41, for example, by means of Near Field Communication (NFC) between the terminal apparatus 3 and the target vehicle.

Further, without being limited to a bar code or a two-dimensional code, the target vehicle ID needs only be able to identify the individual target vehicle, and may be a predetermined number that the user enters into a text box displayed on the display 39 of the terminal apparatus 3.

The unlocking requester 37 transmits an unlocking request to the server 7 via the terminal communicator 41 for unlocking of a door of the reserved vehicle 5. A timing at which the user makes the unlocking request through the terminal apparatus 3 is mainly a point of time at which the target vehicle has arrived at the user's side. The unlocking request that the unlocking requester 37 makes to the server 7 contains the target vehicle ID and the user ID.

The display 39 displays a message indicating that the user may get on the target vehicle, a message indicating that the target vehicle is not the reserved vehicle 5, and the like. For example, the display 39 is a monitor of a liquid crystal display, an LED display, an organic EL display, or the like. For example, the message indicating that the user may get on the target vehicle is "The lock has been undone. Please get on.", "Here is the vehicle you have reserved. Please get on.", or the like. Further, for example, the message indicating that the target vehicle is not the reserved vehicle 5 is "This vehicle is out of service. Please do not get on.", "This vehicle not the vehicle you have reserved. Please check the following vehicle.", "This vehicle is not the vehicle you have reserved. You are not allowed to get on.", "Warning! This vehicle may be a malicious vehicle.", or the like.

The terminal communicator 41 is a communication antenna for performing communication between the reserved vehicle 5 and the server 7. The terminal communicator 41 performs communication such as transmission of a dispatch request to the server 7 and reception of a notification of arrival from the server 7.

The reserved vehicle 5 is a vehicle that the server 7 has decided to dispatch to the user when the user has made a reservation for a vehicle dispatch and that the user is planning to get on. The reserved vehicle 5 has an on-board apparatus 50 loaded with information regarding the reserved vehicle 5.

The on-board apparatus 50 is an apparatus that, for example, controls how the reserved vehicle 5 travels and unlocks the door of the reserved vehicle 5. The on-board apparatus 50 includes an on-board controller 51, an on-board position acquirer 53, an unlocker 55, and an on-board communicator 57.

The on-board controller 51 is a control device that controls how the reserved vehicle 5 travels. The on-board controller 51 receives the after-mentioned dispatch command from the server 7 via the on-board communicator 57 and, in order to dispatch the reserved vehicle 5 to the designated place, controls an actuator of the reserved vehicle 5 in accordance with the dispatch command. This causes the reserved vehicle 5 to move to the designated place.

In receiving the dispatch command, the on-board controller 51 receives, from the server 7 via the on-board communicator 57, a reserved vehicle ID that identifies the reserved vehicle 5. The on-board controller 51 rewrites the reserved vehicle ID of the reserved vehicle 5 so that it is replaced by the new reserved vehicle ID thus received.

The on-board position acquirer 53 is an element and a processor that acquires positional information indicating the present position of the reserved vehicle 5. The on-board position acquirer 53 transmits the positional information thus acquired indicating the present position of the reserved vehicle 5 to the server 7 via the on-board communicator 57, for example, every unit time. The on-board position acquirer 53 acquires the positional information, for example, by means of a function such as a GPS. The positional information indicating the present position of the reserved vehicle 5 is positional information of the reserved vehicle 5. Further, the positional information of the reserved vehicle 5 contains not only the positional information indicating the present position but also information indicating the direction of travel and the like.

The unlocker 55 unlocks the door of the reserved vehicle 5 upon receiving an unlocking instruction from the server 7. Specifically, upon receiving an unlocking instruction from an unlocking instructor 81 of the server 7, the unlocker 55 unlocks, by means of a driver, an electrical lock locking the door.

The on-board communicator 57 is an antenna that can perform communication with the server 7. The on-board communicator 57 performs communication such as reception of a vehicle identifier generated by the server 7 and transmission to the server 7 of vehicle information containing the positional information of the reserved vehicle 5, the information indicating the direction of travel, and the like. The vehicle information here contains information, such as the positional information and the direction of travel, regarding each vehicle that the server 7 manages and, for example, also contains information such as the positional information of the reserved vehicle 5 and the direction of travel of the reserved vehicle 5.

The server 7 is a server that manages the reserved vehicle 5. The server 7 dispatches the reserved vehicle 5 to the designated place, for example, in response to a request from the user. The server 7 includes a vehicle chooser 71, a determiner 75, a message generator 77, an ID generator 79, the unlocking instructor 81, and a transmitter-receiver 83.

At a user's dispatch request, the vehicle chooser 71 chooses which reserved vehicle 5 to dispatch to the user. The vehicle chooser 71 generates a dispatch command to control the reserved vehicle 5 thus chosen so that the reserved vehicle 5 moves to the designated place, and transmits the dispatch command to the reserved vehicle 5 via the transmitter-receiver 83.

Upon choosing which reserved vehicle 5 to dispatch to the user, the vehicle chooser 71 may generate a message indicating the completion of a reservation and transmit information of the message indicating the completion of a reservation to the terminal apparatus 3 via the transmitter-receiver 83.

The determiner 75 determines whether the reserved vehicle 5 has arrived at the place designated by the user. The determination as to whether the reserved vehicle 5 has arrived at the place designated by the user is made depending on whether the positional information of the reserved vehicle 5 that the determiner 75 acquires from the reserved vehicle 5 and the designated place match. The match between the positional information of the reserved vehicle 5 and the designated place is not limited to perfect matching, but there may be a predetermined distance from the designated place.

The determiner 75 includes a positional relationship calculator that acquires the positional information of the terminal apparatus 3 from the terminal apparatus 3 at a predetermined timing and acquires, from the reserved vehicle 5, the positional information of the reserved vehicle 5 contained in the vehicle information. As a result, the positional relationship calculator for example manages information about the position on a map where the reserved vehicle 5 is, the direction on the map in which the reserved vehicle 5 is facing, and the like and calculates the distance between the reserved vehicle 5 and the terminal apparatus 3.

In a case where the determiner 75 has determined that the positional information of the reserved vehicle 5 and positional information indicating a boarding point designated by the user do not substantially match, the determiner 75 determines that the reserved vehicle 5 has not arrived at the place designated by the user. In this case, the message generator 77 generates a message that prompts the user to wait until the reserved vehicle 5 arrives at the designated place, and transmits, to the terminal apparatus 3, information of the message that prompts the user to wait. The boarding point is a position where the user gets on the reserved vehicle 5 and to which the server 7 dispatches the reserved vehicle 5.

On the other hand, in a case where the determiner 75 has determined that the positional information of the reserved vehicle 5 and the positional information indicating the boarding point designated by the user substantially match, the determiner 75 determines that the reserved vehicle 5 has arrived at the place designated by the user. In this case, the message generator 77 generates a message indicating that the user may get on the reserved vehicle 5 and transmits, to the terminal apparatus 3, information of the message indicating that the user may get on the reserved vehicle 5. This allows the user to recognize via the terminal apparatus 3 that he/she can get on the reserved vehicle 5.

Further, in a case where the determiner 75 has determined that the positional information of the reserved vehicle 5 and the positional information indicating the boarding point designated by the user substantially match, the determiner 75 transmits a notification of arrival to the terminal apparatus 3 via the transmitter-receiver 83. A timing at which to send the notification of arrival may for example be such that it is transmitted to the server 7 after the reserved vehicle 5 has arrived at the designated place or it is transmitted to the server 7 in a case where the reserved vehicle 5 has come within a predetermined distance from the designated place. In this case, the on-board controller 51 receives through a function such as a GPS the positional information indicating the boarding point designated by the user and thereby brings the reserved vehicle 5 to a stop at the designated place in a case where the reserved vehicle 5 has arrived at the designated place.

The determiner 75 acquires the user ID and the target vehicle ID from the terminal apparatus 3. The determiner 75 reads out, with reference to dispatch information by which the user ID that identifies the user who has reserved a vehicle dispatch and a reserved vehicle ID that identifies the reserved vehicle 5 are managed in association with each other, the reserved vehicle ID, associated with the user ID, that identifies the reserved vehicle 5. Upon receiving an unlocking request from the terminal apparatus 3, the determiner 75 determines, with reference to the dispatch information, whether the target vehicle ID of the target vehicle received from the terminal apparatus 3 and the reserved vehicle ID generated by the ID generator 79 match.

In a case where the determiner 75 has determined that the target vehicle ID and the reserved vehicle ID match, the unlocking instructor 81 transmits, to the reserved vehicle 5, an unlocking instruction to unlock the door of the reserved vehicle 5. The message generator 77 of the server 7 generates a message indicating that the user may get on the reserved vehicle 5 and transmits, to the terminal apparatus 3, information of the message indicating that the user may get on the reserved vehicle 5.

On the other hand, in a case where the determiner 75 has determined that the target vehicle ID and the reserved vehicle ID do not match, the unlocking instructor 81 transmits an unlocking denial instruction not to unlock the door of the reserved vehicle 5. In this case, the reserved vehicle 5 may lock the door in accordance with the unlocking denial instruction so that the door cannot be unlocked. The message generator 77 generates a message indicating the cancellation of a ride into the target vehicle and transmits information of the message indicating the cancellation of a ride into the target vehicle to the terminal apparatus 3. This allows the user to recognize via the terminal apparatus 3 that he/she cannot get on the reserved vehicle 5.

In a case where the target vehicle ID and the reserved vehicle ID do not match and the target vehicle ID is not contained in the vehicle information, it is conceivable, for example, that the target vehicle may be a general vehicle that the dispatch system 1 does not manage or a malicious vehicle having an evil intention of, for example, abducting the user.

In a case where the target vehicle ID and the reserved vehicle ID do not match and the target vehicle ID is contained in the vehicle information, it is conceivable, for example, that the target vehicle is a vehicle that the dispatch system 1 manages and a reserved vehicle 5 that another user has reserved, a vehicle that the dispatch system 1 manages and that has not been reserved by any user, or a malicious vehicle having an evil intention of, for example, abducting the user.

In a case where the target vehicle ID and the reserved vehicle ID match, the determiner 75 receives the positional information of the terminal apparatus 3 and determines whether the distance between a position indicated by the positional information of the terminal apparatus 3 and a position indicated by the positional information of the reserved vehicle 5 is equal to or shorter than a second prescribed distance. That is, the determiner 75 determines whether the reserved vehicle 5 has arrived at the vicinity of the user. The position indicated by the positional information of the terminal apparatus 3 is synonymous with the present position indicated by the positional information of the terminal apparatus 3.

In a case where the target vehicle ID and the reserved vehicle ID match, the target vehicle is not the reserved vehicle 5 even if the target vehicle has arrived at the user's side, unless the distance between the position indicated by the positional information of the terminal apparatus 3 and the position indicated by the positional information of the reserved vehicle 5 is equal to or shorter than the second prescribed distance. That is, this target vehicle may be a malicious vehicle having an evil intention of, for example, abducting the user. For this reason, the message generator 77 generates a message indicating the cancellation of the user's ride into the target vehicle and transmits the message to the terminal apparatus 3. The position indicated by the positional information of the reserved vehicle 5 is synonymous with the present position indicated by the positional information of the reserved vehicle 5.

In a case where the target vehicle ID and the reserved vehicle ID match, the vehicle that has arrived at the user's side or the vicinity of the user is the reserved vehicle 5, provided the distance between the position indicated by the positional information of the terminal apparatus 3 and the position indicated by the positional information of the reserved vehicle 5 is equal to or shorter than the second prescribed distance. For this reason, the unlocking instructor 81 transmits an unlocking instruction to the reserved vehicle 5 to unlock the door of the reserved vehicle 5. Further, in this case, the message generator 77 generates a message indicating that the user may get on the target vehicle and transmits the message to the terminal apparatus 3. The second prescribed distance is for example a distance from which the terminal apparatus 3 of the user can communicate with the target vehicle.

The determiner 75 receives the positional information of the reserved vehicle 5 and positional information of the target vehicle and determines whether the distance between the position indicated by the positional information of the reserved vehicle 5 and a position indicated by the positional information of the target vehicle is equal to or shorter than a first prescribed distance.

In a case where the distance between the position indicated by the positional information of the reserved vehicle 5 and the position indicated by the positional information of the target vehicle is equal to or shorter than the first prescribed distance, the user may be waiting by mistake at a place different from the designated place although the reserved vehicle 5 has arrived at the designated place. In this case, the message generator 77 generates a message that prompts the user to look around, and transmits the message to the terminal apparatus 3, provided the distance between the position indicated by the positional information of the reserved vehicle 5 and the position indicated by the positional information of the target vehicle is equal to or shorter than the first prescribed distance. This allows the user to recognize via the terminal apparatus 3 that the reserved vehicle 5 is present in an area around him/her.

Unless the distance between the position indicated by the positional information of the reserved vehicle 5 and the position indicated by the positional information of the target vehicle is equal to or shorter than the first prescribed distance, the position to which the reserved vehicle 5 is dispatched is changed to the position indicated by the positional information of the target vehicle. After the position to which the reserved vehicle 5 is dispatched has been changed, the message generator 77 generates a message that prompts the user to wait, and transmits the message to the terminal apparatus 3. This allows the user to recognize via the terminal apparatus 3 that he/she waits until the reserved vehicle 5 arrives.

The message generator 77 generates a message for the terminal apparatus 3 to display and outputs the message to the terminal apparatus 3. In a case where the reserved vehicle ID and the target vehicle ID match, the message generator 77 transmits, to the reserved vehicle 5, an unlocking instruction to unlock the door of the reserved vehicle 5, generates a message indicating that the user may get on the reserved vehicle 5, and transmits the message to the terminal apparatus 3.

Further, in a case where the reserved vehicle ID and the target vehicle ID do not match, the message generator 77 generates a message indicating that the target vehicle is not the reserved vehicle 5, and transmits the message to the terminal apparatus 3.

For example, the ID generator 79 generates a different reserved vehicle ID for each reservation, and such a reserved vehicle ID identifies a reserved vehicle 5 chosen by the vehicle chooser 71 on the basis of a user ID. The ID generator 79 transmits the reserved vehicle ID thus generated to the reserved vehicle 5 via the transmitter-receiver 83. The reserved vehicle ID is an identifier that is determined by a temporary random number. Upon receiving the reserved vehicle ID from the server 7, the reserved vehicle 5 rewrites the reserved vehicle ID of the reserved vehicle 5 so that it is replaced by the new reserved vehicle ID thus received. The ID generator 79 acquires time information from a timer (not illustrated) and grants, to the reserved vehicle ID, time information indicating a point of time at which the reserved vehicle ID was generated.

In a case where the target vehicle is the reserved vehicle 5, the unlocking instructor 81 generates an unlocking instruction to unlock the door of the reserved vehicle 5 and transmits the unlocking instruction to the reserved vehicle 5.

The transmitter-receiver 83 is a communication device that performs communication with the reserved vehicle 5 and the terminal apparatus 3. The transmitter-receiver 83 performs communication such as reception of a dispatch request from the terminal apparatus 3, transmission of a reserved vehicle ID and a dispatch command to the reserved vehicle 5, and reception from the terminal apparatus 3 of the user of a target vehicle ID that identifies the target vehicle. The transmitter-receiver 83 is an example of the communicator.

In Embodiment 1, the server 7 is characterized in that the server 7 generates, on the basis of a determination as to whether the distance between the position indicated by the positional information of the terminal apparatus 3 and the position indicated by the positional information of the target vehicle is equal to or shorter than the second prescribed distance, a message indicating the cancellation of a ride into the target vehicle, that the server 7 generates a message indicating that the user may get on the target vehicle and transmits the message to the terminal apparatus 3, that on the basis of a determination as to whether the distance between the position indicated by the positional information of the reserved vehicle 5 and the position indicated by the positional information of the target vehicle is equal to or shorter than the first prescribed distance, the server generates a message that prompts the user to look around, and transmits the message to the terminal apparatus 3 or the server 7 changes, to the position indicated by the positional information of the target vehicle, the position to which the reserved vehicle 5 is dispatched, generates a message that prompts the user to wait, and transmits the message to the terminal apparatus 3, that the server 7 changes reserved vehicle IDs for each vehicle dispatch, and that by determining, with reference to the dispatch information, whether the reserved vehicle ID associated with the user ID and the target vehicle ID match, the server 7 determines whether the target vehicle is the reserved vehicle 5.

Operation

The following describes an operation of the dispatch system 1 according to Embodiment 1.

FIG. 3 is a sequence diagram showing an operation of the dispatch system 1 according to Embodiment 1.

As shown in FIG. 3, first, the user causes the terminal apparatus 3 to activate a dedicated application for reserving a vehicle dispatch. The user makes a dispatch request. Specifically, the dispatch requester 31 of the terminal apparatus 3 makes a dispatch request to the server 7 via the terminal communicator 41 (S1). Meanwhile, a user ID that identifies the user, positional information indicating a boarding point designated by the user, and the like are transmitted.

Next, the server 7 receives the dispatch request, chooses which reserved vehicle 5 to dispatch to the user, generates a different reserved vehicle ID for each reservation, and transmits this reserved vehicle ID to the reserved vehicle 5 (S11). Specifically, the vehicle chooser 71 chooses which reserved vehicle 5 to dispatch to the user. The ID generator 79 generates a different reserved vehicle ID for each reservation that identifies the reserved vehicle 5 chosen by the vehicle chooser 71, transmits the new reserved vehicle ID thus generated to the reserved vehicle 5 via the transmitter-receiver 83 (S11), and causes the reserved vehicle 5 to update the reserved vehicle ID so that it is replaced by the new reserved vehicle ID thus received. Further, the vehicle chooser 71 of the server 7 generates a dispatch command to dispatch the reserved vehicle 5 and transmits the dispatch command to the reserved vehicle 5 via the transmitter-receiver 83 (S11). In step S11, the server 7 receives the user ID from the terminal apparatus 3 and stores the user ID, the reserved vehicle ID, and the like as a part of the dispatch information in a storage such as a memory.

FIGS. 4A and 4B illustrate diagrams showing dispatch information and vehicle information, respectively, according to Embodiment 1. As shown in FIG. 4A, the dispatch information contains a list of user IDs of users who have made reservations, a list of managed vehicle IDs, information indicating boarding points, and the like. The managed vehicle IDs are identifiers that identify vehicles, including the reserved vehicle ID of the reserved vehicle 5 that the server 7 manages. That is, the managed vehicle IDs are the respective identifiers of a plurality of vehicles that the server 7 manages.

As shown in FIG. 4B, the vehicle information contains information such as a list of managed vehicle IDs, positional information of reserved vehicles 5, information indicating directions of travel, and the like. The managed vehicle IDs are the same as those of FIG. 4A. The positional information indicates the present position of each vehicle that the server 7 manages. This positional information contains the present position of the reserved vehicle 5. The directions of travel indicates the direction in which each vehicle that the server 7 manages is facing. These directions of travel include the direction of travel of the reserved vehicle 5.

As shown in FIG. 3, in transmitting the reserved vehicle ID to the terminal apparatus 3, the vehicle chooser 71 may generate information that causes the terminal apparatus 3 to display a message to the effect that a reservation has been completed and may transmit the information to the terminal apparatus 3 via the transmitter-receiver 83. Further, in the absence of a dispatchable vehicle, the server 7 may transmit, to the terminal apparatus 3, information representing a message indicating, for example, that a reservation has not been completed and that a request for reservation should be made again at a later time.

Next, the reserved vehicle 5 receives the dispatch command and the reserved vehicle ID from the server 7 via the on-board communicator 57. The server 7 causes the reserved vehicle 5 to update the existing reserved vehicle ID so that it is replaced by the new reserved vehicle ID thus received. The on-board communicator 51 of the reserved vehicle 5 exercises vehicle control, i.e. controls the actuator of the reserved vehicle 5, in accordance with the dispatch command so that the reserved vehicle 5 travels to the designated place (S21). This causes the reserved vehicle 5 to move to the designated place.

Next, the on-board position acquirer 53 of the reserved vehicle 5 receives the positional information of the reserved vehicle 5 by means of a function such as a GPS and transmits the positional information of the reserved vehicle 5 to the server 7 (S22).

The server 7 acquires the positional information of the reserved vehicle 5 and determines whether the present position of the reserved vehicle 5 the designated place and match. That is, the determiner 75 of the server 7 determines whether the reserved vehicle 5 has arrived at the place designated by the user (S12). In a case where the determiner 75 has determined that the reserved vehicle 5 has not arrived at the place designated by the user (No in S12), the determiner 75 makes the same determination until the reserved vehicle 5 arrives at the designated place. The server 7 may store the positional information thus received of the reserved vehicle 5 as a part of the vehicle information in the storage such as a memory.

In a case where the determiner 75 has determined that the reserved vehicle 5 has arrived at the place designated by the user (Yes in S12), the determiner 75 transmits, to the terminal apparatus 3, a notification of arrival indicating that the reserved vehicle 5 has arrived (S13). Upon receiving the notification of arrival from the server 7, the terminal apparatus 3 notifies the user that the reserved vehicle 5 has arrived at the user's side. For example, the terminal apparatus 3 notifies the user by displaying the arrival of the reserved vehicle 5 on the display 39, making a sound by means of a speaker or the like, or vibrating by means of a vibration function or the like.

Next, in order to confirm whether a target vehicle having arrived at the user's side is the reserved vehicle 5, the user holds the terminal apparatus 3 out toward the target vehicle and performs a predetermined operation. Specifically, by reading, with the camera of the like of the terminal apparatus 3, a license plate, a one-dimensional code, a QR code (registered trademark), or a two-dimensional code such as a color code shown on the target vehicle, the target vehicle ID acquirer 35 of the terminal apparatus 3 acquires a target vehicle ID, held by the target vehicle, that is used to identify whether the target vehicle is the reserved vehicle 5 (S2).

Next, the terminal apparatus 3 stores the target vehicle ID in the storage such as a memory and makes an unlocking request to the server 7 for unlocking of the door of the reserved vehicle 5 (S3). Specifically, the terminal apparatus 3 transmits, to the server 7, an unlocking request containing the user ID, the target vehicle ID, the positional information of the terminal apparatus 3, and the like (S3).

Next, upon receiving the unlocking request from the terminal apparatus 3, the determiner 75 of the server 7 determines whether the target vehicle is the reserved vehicle 5 (S14). Specifically, the server 7 acquires the user ID and the target vehicle ID from the terminal apparatus 3. With reference to the dispatch information, the determiner 75 of the server 7 reads out the reserved vehicle ID, associated with the user ID thus acquired, which identifies the reserved vehicle 5. The determiner 75 determines whether the reserved vehicle ID and the target vehicle ID match.

In a case where the determiner 75 has determined that the target vehicle is the reserved vehicle 5 (Yes in S14), the unlocking instructor 81 of the terminal apparatus 3 transmits, to the reserved vehicle 5, an unlocking instruction to unlock the door of the reserved vehicle 5 (S15).

Next, upon receiving the unlocking instruction, the unlocker 55 of the reserved vehicle 5 unlocks the door of the reserved vehicle 5 (S24). Then, the unlocker 55 transmits, to the server 7, information indicating an unlocking result of having unlocked the door of the reserved vehicle 5 (S24).

Next, the message generator 77 of the server 7 generates a message and transmits it to the terminal apparatus 3 (S16). Specifically, since the door of the reserved vehicle 5 has been unlocked in step S24, the message generator 77 generates a message indicating to the user that the user may get on the target vehicle and transmits, to the terminal apparatus 3, information of the message indicating that the user may get on the target vehicle (S16).

Next, the display 39 of the terminal apparatus 3 receives the information of the message indicating to the user that the user may get on the target vehicle and displays the message indicating that the user may get on the target vehicle (S4). Then, the dispatch system 1 ends this flow.

On the other hand, in a case where the determiner 75 has determined that the target vehicle is not the reserved vehicle 5 (No in S14), the message generator 77 of the server 7 generates a message indicating to the user the cancellation of a ride into the target vehicle and transmits, to the terminal apparatus 3, information of the message indicating the cancellation of a ride into the target vehicle (S16).

Next, the display 39 of the terminal apparatus 3 receives the information of the message indicating the cancellation of a ride into the target vehicle to the user and displays the message indicating the cancellation of a ride into the target vehicle (S4). Then, the dispatch system 1 ends this flow.

The following describes an example of an operation in the dispatch system 1 according to Embodiment 1 in which a target vehicle has arrived at the user's side.

Figure 5:
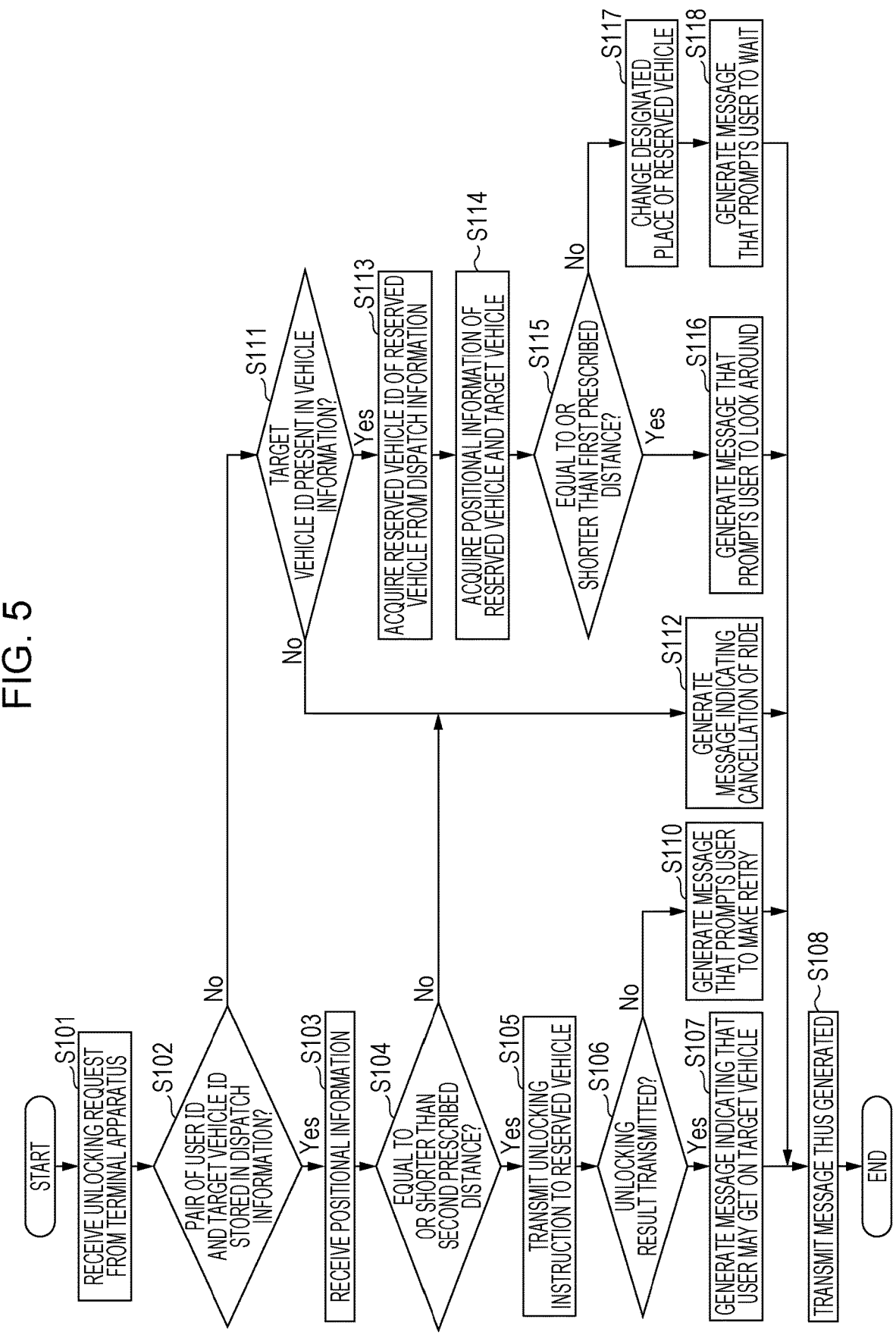
FIG. 5 is a flow chart showing an operation in a server of the dispatch system according to Embodiment 1.
Figure 6A:
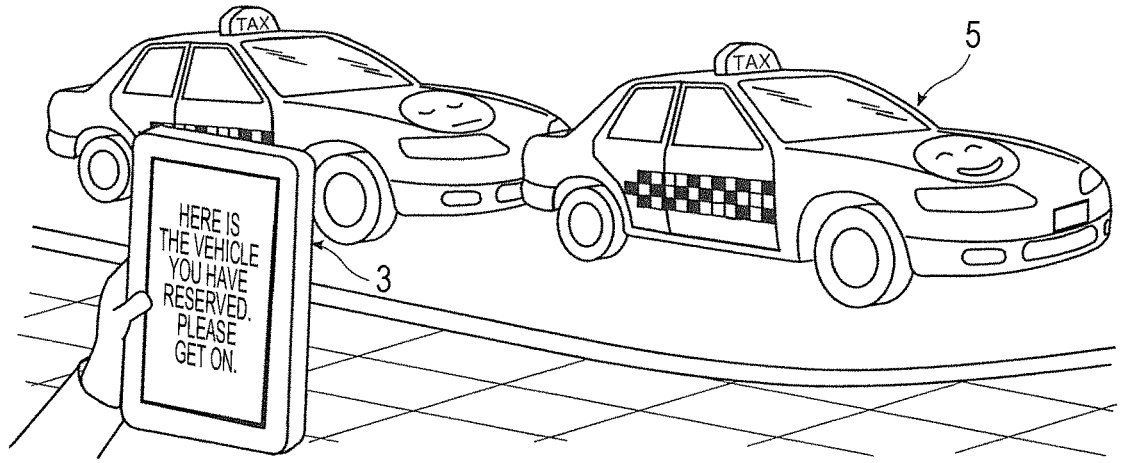
FIGS. 6A to 6C illustrate schematic views each showing a state of authentication of a target vehicle in the dispatch system according to Embodiment 1.
Figure 6B:
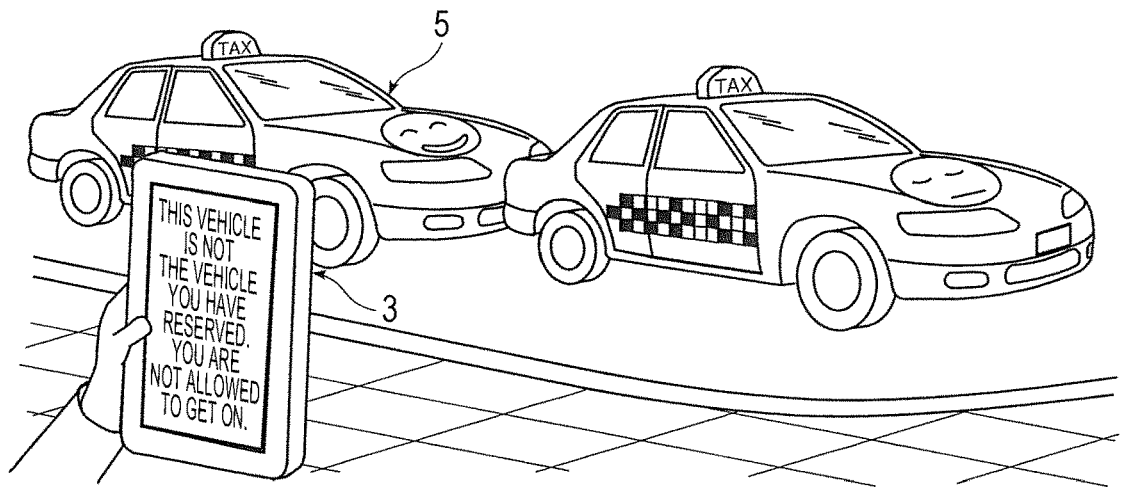
Figure 6C:
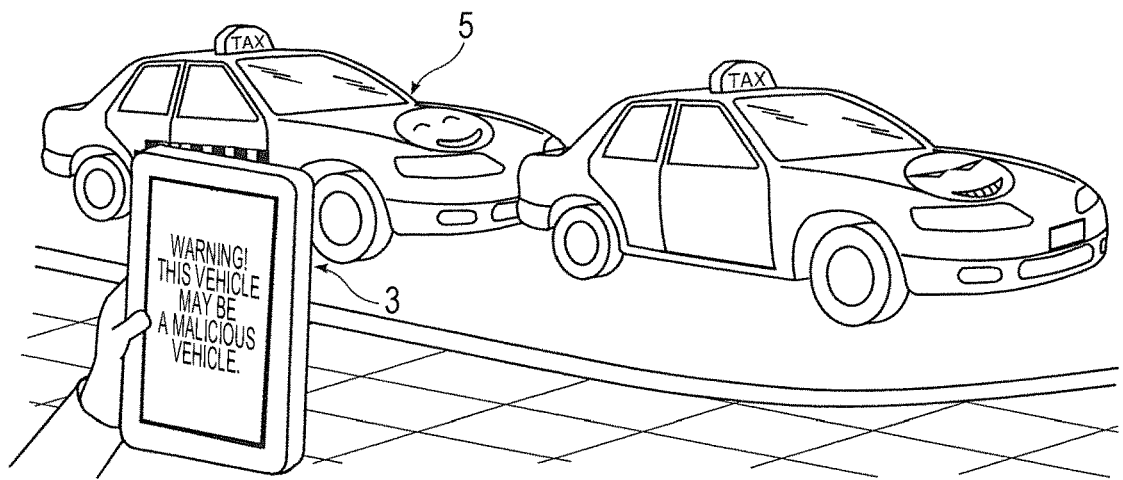

FIG. 5 is a flow chart showing an operation in the server 7 of the dispatch system 1 according to Embodiment 1. FIGS. 6A to 6C illustrate schematic views each showing a state of authentication of a target vehicle in the dispatch system 1 according to Embodiment 1. FIG. 5 is a flow chart explaining steps S14 to S16 of FIG. 3 in concrete terms. FIG. 6A shows that the target vehicle is the reserved vehicle 5. FIG. 6B simply shows that the target vehicle is not the reserved vehicle 5. FIG. 6C shows that the target vehicle is a possibly malicious vehicle.

As shown in FIGS. 5 and 6A to 6C, first, when the terminal apparatus 3 makes an unlocking request to the server 7, the server 7 receives the unlocking request from the terminal apparatus 3 (S101). Specifically, the server 7 receives, from the terminal apparatus 3, an unlocking request containing the user ID, the target vehicle ID, the positional information of the terminal apparatus 3, and the like (S101).

Next, the determiner 75 determines whether a pair of the user ID and the target vehicle ID is stored (contained) in the dispatch information that the server 7 has (S102). Specifically, the server 7 acquires the pair of the user ID and the target vehicle from the terminal apparatus 3. With reference to the dispatch information, the determiner 75 of the server 7 reads out a reserved vehicle ID, associated with the user ID thus acquired, that identifies the reserved vehicle 5. The determiner 75 determines whether the reserved vehicle ID and the target vehicle ID match.

Having determined that the pair of the user ID and the target vehicle ID is stored in the dispatch information (Yes in S102), the determiner 75 receives the positional information of the reserved vehicle 5 from the reserved vehicle 5 (S103). In a case where the server 7 does not receive the positional information of the terminal apparatus 3 from the terminal apparatus 3 in step S101, the server 7 may receive it in step S103.

Next, the determiner 75 determines whether the position indicated by the positional information of the reserved vehicle 5 is at the second prescribed distance or shorter from the position indicated by the positional information of the terminal apparatus 3 (S104).

In a case where the determiner 75 determines that the position indicated by the positional information of the reserved vehicle 5 is at the second prescribed distance or shorter from the position indicated by the positional information of the terminal apparatus 3 (Yes in S104), the determiner 75 transmits an unlocking instruction to the reserved vehicle 5 (S105).

Next, after the unlocker 55 of the reserved vehicle 5 has unlocked the door of the reserved vehicle 5, the determiner 75 determines whether information, transmitted from the reserved vehicle 5, that indicates an unlocking result of having unlocked the door of the reserved vehicle 5 has been received (S106).

In a case where the determiner 75 has determined that information indicating an unlocking result has been received from the reserved vehicle 5, i.e. in a case where an unlocking result has been received (Yes in S106), the message generator 77 of the server 7 generates a message indicating to the user that the user may get on the target vehicle (S107) and transmits, to the terminal apparatus 3, information of the message indicating that the user may get on the target vehicle (S108). For example, the message indicating to the user that the user may get on the target vehicle is "The lock has been undone. Please get on." or the like. Then, the dispatch system 1 ends this flow.

On the other hand, in a case where the determiner 75 has determined in step S106 that information indicating an unlocking result has not been received (No in S106), the message generator 77 of the server 7 generates a message that prompts the user to make a retry (S110), and transmits, to the terminal apparatus 3, information of the message that prompts the user to make a retry (S108). For example, the message that prompts the user to make a retry is "Unlocking failed. Please perform reading again." or the like. Then, the dispatch system 1 ends this flow.

Further, in a case where the determiner 75 determines in step S104 that the position indicated by the positional information of the reserved vehicle 5 is at a distance longer than the second prescribed distance from the position indicated by the positional information of the terminal apparatus 3 (No in S104), the message generator 77 of the server 7 generates a message indicating the cancellation of a ride into the target vehicle so that the user does not get on the target vehicle that is present at the user's side, and transmits, to the terminal apparatus 3, information of the message indicating the cancellation of a ride into the target vehicle (S112). Then, the message generator 77 transmits, to the terminal apparatus 3, a message that prompts the user to wait (S108). Then, the dispatch system 1 ends this flow. For example, the message indicating the cancellation of a ride into the target vehicle is "Warning! This vehicle may be a malicious vehicle.", which is shown in FIG. 6C, or the like. This is because, in the case of arrival of a target vehicle other than the reserved vehicle 5, which has not arrived at the user's side, it is conceivable that the target vehicle is a malicious vehicle having an evil intention of, for example, abducting the user or unjustifiably charging the user, for example, by making the user unable to undo the lock unless he/she pays the exorbitantly high price in getting off the vehicle. The message indicating the cancellation of a ride into the target vehicle is included in a message indicating that the target vehicle is not the reserved vehicle 5.

On the other hand, having determined in step S102 that the pair of the user ID and the target vehicle ID is not stored in the dispatch information (No in S102), the determiner 75 determines whether the target vehicle ID is contained in the vehicle information (S111).

In a case where the determiner 75 has determined that the target vehicle ID is not present in the vehicle information (No in S111), the message generator 77 of the server 7 generates a message indicating the cancellation of a ride into the target vehicle so that the user does not get on the target vehicle that is at the user's side (S112). For example, the message indicating the cancellation of a ride into the target vehicle is "This vehicle is out of service. Please do not get on." or the like. This is because, in the case of arrival at the user's side of a target vehicle other than the reserved vehicle 5, there is a possibility that if the target vehicle ID is not present in the dispatch information, the target vehicle may be a general vehicle that is out of the dispatch system 1.

Then, the message generator 77 transmits, to the terminal apparatus 3, information of the message indicating the cancellation of a ride into the target vehicle (S108). Then, the dispatch system 1 ends this flow.

In a case where the determiner 75 has determined that the target vehicle ID is contained in the vehicle information (Yes in S111), the determiner 75 acquires the reserved vehicle ID of the reserved vehicle 5 from the dispatch information (S113). The determiner 75 makes such a determination in order to surely make the user get on the reserved vehicle 5 that the user should get on.

Next, the determiner 75 acquires the positional information of the reserved vehicle 5 from the reserved vehicle 5 and the positional information of the target vehicle from the terminal apparatus 3 (S114). For example, the positional relationship calculator of the determiner 75 acquires, from the positional information of the terminal apparatus 3 and the like, the information indicating the direction of travel of the target vehicle and the position of the target vehicle.

Next, the determiner 75 determines whether the distance between the position indicated by the positional information of the reserved vehicle 5 and the position indicated by the positional information of the target vehicle is equal to or shorter than the first prescribed distance (S115). The determiner 75 makes such a determination for example because there is a case where the user is for example mistakenly waiting at a place different from the designated place.

When the determiner 75 determines that the distance between the position indicated by the positional information of the reserved vehicle 5 and the position indicated by the positional information of the target vehicle is equal to or shorter than the first prescribed distance (Yes in S115), the message generator 77 of the server 7 generates a message that prompts the user to look around (S116). For example, the message that prompts the user to look around is "This vehicle not the vehicle you have reserved. Please check the following vehicle.", "This vehicle not the vehicle you have reserved. Please check a vehicle 30 m behind.", "This vehicle not the vehicle you have reserved. Please check a vehicle on the opposite lane.", or the like. The message that prompts the user to look around is included in the message indicating that the target vehicle is not the reserved vehicle 5. Further, a message that prompts the user to wait, such as "This vehicle not the vehicle you have reserved. Please wait. The vehicle you have reserved is coming in about 10 minutes.", may be used as the message indicating that the target vehicle is not the reserved vehicle 5. The message that prompts the user to wait is included in the message indicating that the target vehicle is not the reserved vehicle 5.

Then, the message generator 77 transmits, to the terminal apparatus 3, information of the message that prompts the user to look around (S108). Then, the dispatch system 1 ends this flow.

Having determined that the distance between the position indicated by the positional information of the reserved vehicle 5 and the position indicated by the positional information of the target vehicle is longer than the first prescribed distance (No in S115), the determiner 75 changes the designated place of the reserved vehicle 5 (S117).

Next, the message generator 77 generates a message that prompts the user to wait (S118). For example, the message that prompts the user to wait is "This vehicle is not the vehicle you have reserved. Please wait here. We will call the vehicle you have reserved." or the like. The message that prompts the user to wait is included in the message indicating that the target vehicle is not the reserved vehicle 5.

Then, the message generator 77 transmits, to the terminal apparatus 3, the message that prompts the user to wait (S108). Then, the dispatch system 1 ends this flow.

Working Effects

The following describes the working effects of the authentication method, the program, the server 7, and the dispatch system 1 according to Embodiment 1.

As mentioned above, in the authentication method according to Embodiment 1, for example, by the user simply using the terminal apparatus 3 to read the target vehicle ID of the target vehicle that has arrived at the user's side, the target vehicle ID thus read is transmitted to the server 7. The server 7 determines, with reference to dispatch information by which the user ID that identifies the user who has reserved a vehicle dispatch and a reserved vehicle ID that identifies the reserved vehicle are managed in association with each other, whether the reserved ID vehicle associated with the user ID and the target vehicle ID match, thereby determining whether the target vehicle is the reserved vehicle 5. In a case where the target vehicle is the reserved vehicle 5, the server 7 transmits, to the reserved vehicle 5, an unlocking instruction to unlock a door of the reserved vehicle 5, generates a message indicating that the user may get on the reserved vehicle 5, and transmits the message to the terminal apparatus 3. On the other hand, in a case where the target vehicle is not the reserved vehicle 5, the server 7 generates a message indicating that the target vehicle is not the reserved vehicle 5, and transmits the message to the terminal apparatus 3. This allows the user to judge, for example, whether the user may get on the reserved vehicle 5 or whether the user must not get on the vehicle. For example, the security of vehicle authentication can be enhanced by reducing the occurrence of trouble such as a situation where a user gets into danger of, for example, being abducted, a situation where the user is unjustifiably charged by being made unable to undo the lock unless he/she pays the exorbitantly high price in getting off the vehicle, or a situation where someone other than the user steals a ride in the reserved vehicle 5 without asking. This makes it possible to enhance the safety of the user.

Further, referring to the dispatch information allows the server 7 to determine, through the reserved vehicle ID and the target vehicle ID, the reserved vehicle 5 that the user should get on and to determine, through the user ID, the user that the reserved vehicle 5 allows to get on it. For this reason, by the user simply reading the target vehicle ID of the target vehicle that has arrived at the user's side, the server 7 is enabled to perform mutual authentication of the target vehicle and the terminal apparatus 3 of the user. That is, the server 7 performs mutual authentication by allowing the user to authenticate the target vehicle through the terminal apparatus 3 and allowing the target vehicle to authenticate whether the target vehicle may allow the user to get on it. This makes it easy for the user to perform authentication.

Accordingly, this vehicle authentication method makes it possible to enhance the safety of the user and easily perform vehicle authentication. Since the server 7 easily performs vehicle authentication, the user rides in the reserved vehicle 5 for a shorter period of time. This makes it possible to improve the efficiency of operation of the dispatch system 1 including at least the reserved vehicle 5 and the terminal apparatus 3. This makes it possible to achieve a reduction in hourly unit cost of the dispatch system 1. As a result, an increase in efficiency of the dispatch system 1 as a whole can be achieved.

Further, a program according to Embodiment 1 that causes a computer to execute the authentication method, the server 7, and the dispatch system 1 bring about the same working effects as those of the authentication method.

Further, the authentication method according to Embodiment 1 is configured such that in a case where the reserved vehicle ID and the target vehicle ID do not match, the server 7 determines whether the target vehicle ID is contained in the vehicle information that the server 7 manages. In a case where the target vehicle ID is not contained in the vehicle information, it is conceivable that the target vehicle is not a vehicle that the server 7 manages. Therefore, the server 7 generates a message indicating the cancellation of a ride into the target vehicle, which may be a malicious vehicle or the like having an evil intention of, for example, abducting the user or unjustifiably charging the user, for example, by making the user unable to undo the lock unless he/she pays the exorbitantly high price in getting off the vehicle, and transmits the message to the terminal apparatus 3. This causes the terminal apparatus 3 to display the message indicating the cancellation of a ride into the target vehicle. This in turn makes it possible to more surely reduce the occurrence of trouble such as the abduction of the user by a malicious vehicle.

By stopping the user from getting on a malicious vehicle, the server 7 makes it possible to reduce wasteful dispatch of the reserved vehicle 5 by the server 7, thus making it possible to curb a reduction in efficiency of operation of the dispatch system 1.

Further, the authentication method according to Embodiment 1 is configured such that in a case where the target vehicle ID is contained in the vehicle information, the server 7 receives positional information of the reserved vehicle 5 and positional information of the target vehicle and determines whether a distance between a position indicated by the positional information of the reserved vehicle 5 and a position indicated by the positional information of the target vehicle is equal to or shorter than a first prescribed distance. If the distance is equal to or shorter than the first prescribed distance, the server 7 generates a message that prompts the user to look around, and transmits the message to the terminal apparatus 3. For this reason, since the terminal apparatus 3 displays a message that prompts the user to look around, the user can recognize that the reserved vehicle 5 is present in an area around him/her. This makes it possible to save the user the trouble of looking for the reserved vehicle 5.

This makes it possible to shorten the time it takes for the user to find the reserved vehicle 5, thus making it possible to improve the efficiency of operation of the dispatch system 1.

In particular, the terminal apparatus 3 displays a message, indicating a specific relative position, that prompts the user to look around, such as "opposite lane" or "50 m behind". This allows the user to recognize the specific position of the reserved vehicle 5, thus making it possible to greatly save the user the trouble of looking for the reserved vehicle 5.

The authentication method according to Embodiment 1 is configured such that in a case where the target vehicle ID is contained in the vehicle information, the server 7 receives positional information of the reserved vehicle 5 and positional information of the target vehicle and determines whether a distance between a position indicated by the positional information of the reserved vehicle 5 and a position indicated by the positional information of the target vehicle is equal to or shorter than a first prescribed distance. If the distance is not equal to or shorter than the first prescribed distance, the server 7 changes, to the position indicated by the positional information of the target vehicle, a position to which the reserved vehicle 5 is dispatched, generates a message that prompts the user to wait, and transmits the message to the terminal apparatus 3. This allows the server 7 to dispatch the reserved vehicle 5 down in front of the user. This makes it possible to save the user the trouble of looking for the reserved vehicle 5.

This makes it possible to shorten the time it takes for the user to find the reserved vehicle 5, thus making it possible to improve the efficiency of operation of the dispatch system 1.

Further, the authentication method according to Embodiment 1 is configured such that in a case where the reserved vehicle ID and the target vehicle ID match, the server 7 receives positional information of the terminal apparatus 3 and determines whether a distance between a position indicated by the positional information of the terminal apparatus 3 and the position indicated by the positional information of the target vehicle is equal to or shorter than a second prescribed distance. If the distance is not equal to or shorter than the second prescribed distance, the server 7 generates a message indicating a cancellation of a ride into the target vehicle and transmits the message to the terminal apparatus 3. For example, in a case where the reserved vehicle 5 is not located near the user, a target vehicle other than the reserved vehicle 5 may arrive at the user's side. In this case, it is conceivable that the target vehicle may be a malicious vehicle having an evil intention of, for example, abducting the user or unjustifiably charging the user, for example, by making the user unable to undo the lock unless he/she pays the exorbitantly high price in getting off the vehicle. For this reason, the server 7 transmits, to the terminal apparatus 3, a message indicating to the user that the target vehicle is a malicious vehicle (i.e. a message indicating the cancellation of a ride into the target vehicle), whereby the terminal apparatus 3 displays the message indicating the cancellation of a ride into the target vehicle, which is a malicious vehicle. This allows the user to recognize that the target vehicle is not the reserved vehicle 5 but a malicious vehicle.

Alternatively, if the distance is equal to or shorter than the second prescribed distance, the server 7 generates a message indicating that the user may get on the target vehicle and transmits the message to the terminal apparatus 3. For example, in a case where the reserved vehicle 5 is located near, e.g. in front of, the user, the server 7 transmits, to the terminal apparatus 3, a message indicating the arrival of the reserved vehicle 5, whereby the terminal apparatus 3 displays a message indicating that the target vehicle is the reserved vehicle 5, i.e. that the user may get on the target vehicle.

This in turn makes it possible to more surely reduce the occurrence of trouble such as the abduction of the user by a malicious vehicle.

Further, by stopping the user from getting on a malicious vehicle, the server 7 can make the user get on the reserved vehicle 5. This makes it possible to more surely perform mutual authentication of the target vehicle and the terminal apparatus 3 of the user and reduce wasteful dispatch of the reserved vehicle 5 by the server 7, thus making it possible to curb a reduction in efficiency of operation of the dispatch system 1.

Further, the authentication method according to Embodiment 1 is configured such that the server 7 generates a different reserved vehicle ID for each reservation, transmits the reserved vehicle ID thus generated to the reserved vehicle 5, and causes the reserved vehicle 5 to update the reserved vehicle ID so that it is replaced by the new reserved vehicle ID thus received. For this reason, since the server 7 changes reserved vehicle IDs each time the server 7 performs a dispatch, it becomes difficult for a malicious vehicle having an evil intension of, for example, abducting the user to easily forge a reserved vehicle ID. This makes it possible to more surely reduce the occurrence of trouble such as the abduction of the user by a malicious vehicle.

Further, by more surely reducing the occurrence of trouble such as the abduction of the user by a malicious vehicle, the server 7 can make the user get on the reserved vehicle 5. This makes it possible to more surely perform mutual authentication of the target vehicle and the terminal apparatus 3 of the user and reduce wasteful dispatch of the reserved vehicle 5 by the server 7, thus making it possible to curb a reduction in efficiency of operation of the dispatch system 1.

Embodiment 2

The following describes a dispatch system 200 according to Embodiment 2.

Figure 7:
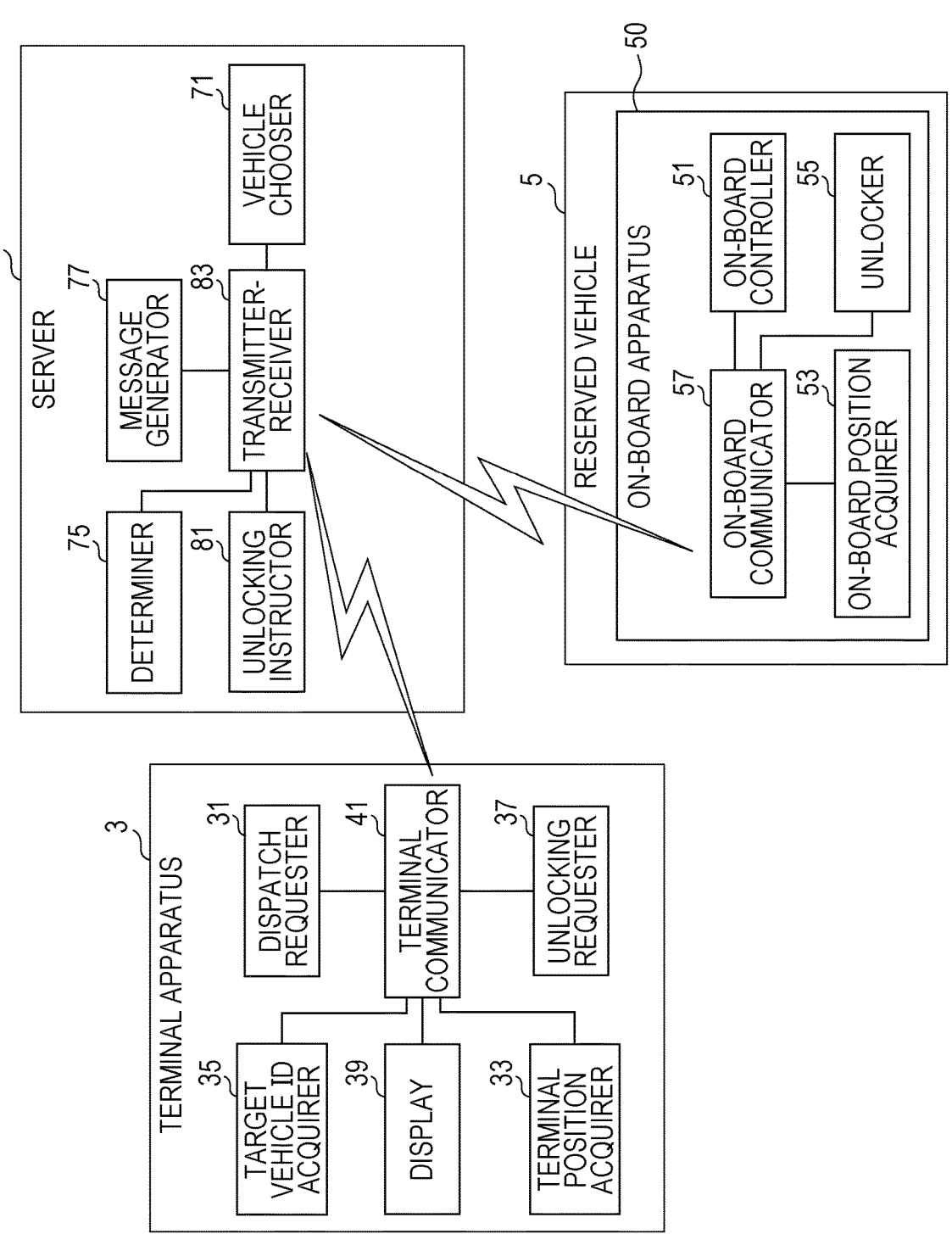
FIG. 7 is a block diagram showing a dispatch system according to Embodiment 2.

FIG. 7 is a block diagram showing the dispatch system 200 according to Embodiment 2.

Embodiment 2 differs from Embodiment 1 in that Embodiment 2 does not have an ID generator 79 such as that of Embodiment 1 shown in FIG. 2. A configuration of the dispatch system 200 according to Embodiment 2 is the same in other respects as that of Embodiment 1, and identical components are given identical signs and are not described in detail below.

In the configuration of the dispatch system 200, the server 7 does not generate a different reserved vehicle ID for each reservation from a user. For this reason, in Embodiment 2, the reserved vehicle 5 has its reserved vehicle ID set in advance.

Operation

The following describes an operation of the dispatch system 200 according to Embodiment 2.

Figure 8:
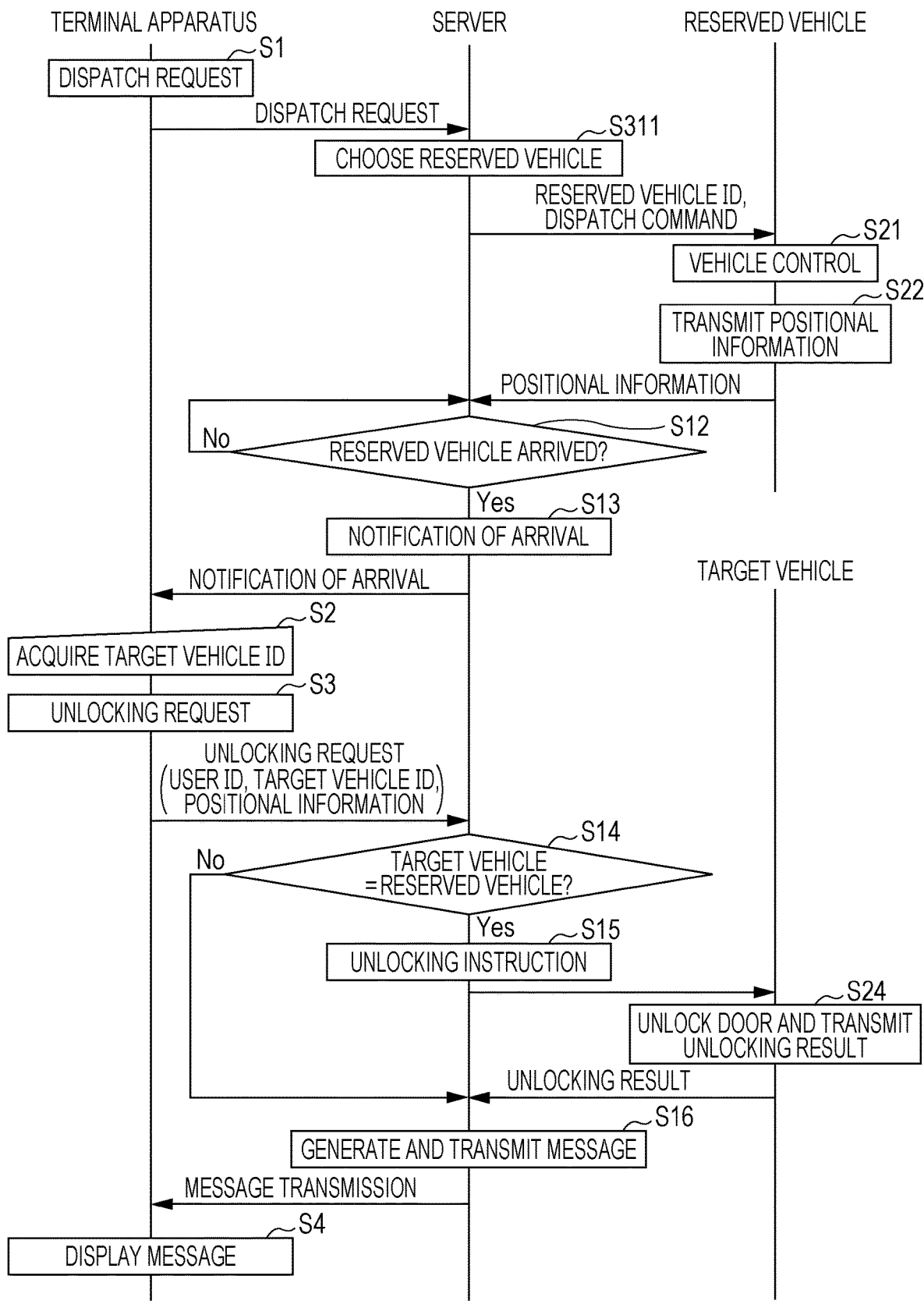
FIG. 8 is a sequence diagram showing an operation of the dispatch system according to Embodiment 2.

FIG. 8 is a sequence diagram showing an operation of the dispatch system 200 according to Embodiment 2.

Embodiment 2 differs from Embodiment 1 in that in step S11 of Embodiment 1 shown in FIG. 3, Embodiment 2 generates a reserved vehicle ID which is different from that generated for the previous reservation. In other respects, the same process is performed; therefore, Embodiment 2 omits to describe a process which is the same as that shown in FIG. 3.

As shown in FIGS. 3 and 8, first, the user makes a dispatch request. Specifically, the dispatch requester 31 of the terminal apparatus 3 makes a dispatch request to the server 7 via the terminal communicator 41 (S1).

Next, the server 7 receives the dispatch request and chooses which reserved vehicle 5 to dispatch to the user (S311).

Next, the on-board communicator 51 of the reserved vehicle 5 controls the actuator of the reserved vehicle 5 in accordance with the dispatch command so that the reserved vehicle 5 travels to the designated place (S21).

Next, the on-board position acquirer 53 of the reserved vehicle 5 receives the positional information of the reserved vehicle 5 by means of a function such as a GPS and transmits the positional information of the reserved vehicle 5 to the server 7 (S22).

Next, the determiner 75 of the server 7 determines whether the reserved vehicle 5 has arrived at the place designated by the user (S12). In a case where the determiner 75 has determined that the reserved vehicle 5 has not arrived at the place designated by the user (No in S12), the determiner 75 makes the same determination until the reserved vehicle 5 arrives at the designated place.

In a case where the determiner 75 has determined that the reserved vehicle 5 has arrived at the place designated by the user (Yes in S12), the determiner 75 transmits, to the terminal apparatus 3, a notification of arrival indicating that the reserved vehicle 5 has arrived (S13). Upon receiving the notification of arrival from the server 7, the terminal apparatus 3 notifies the user that the reserved vehicle 5 has arrived at the user's side.

Next, by reading, with the camera of the like of the terminal apparatus 3, a license plate, a one-dimensional code, a QR code (registered trademark), or a two-dimensional code such as a color code shown on the target vehicle, the target vehicle ID acquirer 35 of the terminal apparatus 3 acquires a target vehicle ID, held by the target vehicle, that is used to identify whether the target vehicle is the reserved vehicle 5 (S2).

Next, the terminal apparatus 3 stores the target vehicle ID in the storage such as a memory and makes an unlocking request to the server 7 for unlocking of the door of the reserved vehicle 5 (S3). Specifically, the terminal apparatus 3 transmits, to the server 7, an unlocking request containing the user ID, the target vehicle ID, the positional information of the terminal apparatus 3, and the like (S3).

Next, upon receiving the unlocking request from the terminal apparatus 3, the determiner 75 of the server 7 determines whether the target vehicle is the reserved vehicle 5 (S14).

In a case where the determiner 75 has determined that the target vehicle is the reserved vehicle 5 (Yes in S14), the unlocking instructor 81 of the terminal apparatus 3 transmits, to the reserved vehicle 5, an unlocking instruction to unlock the door of the reserved vehicle 5 (S15).

Next, upon receiving the unlocking instruction, the unlocker 55 of the reserved vehicle 5 unlocks the door of the reserved vehicle 5 (S24). Then, the unlocker 55 transmits, to the server 7, information indicating an unlocking result of having unlocked the door of the reserved vehicle 5 (S24).

Next, the message generator 77 of the server 7 generates a message and transmits it to the terminal apparatus 3 (S16).

Next, the display 39 of the terminal apparatus 3 receives the information of the message indicating to the user that the user may get on the target vehicle and displays the message indicating that the user may get on the target vehicle (S4). Then, the dispatch system 200 ends this flow.

On the other hand, in a case where the determiner 75 has determined that the target vehicle is not the reserved vehicle 5 (No in S14), the message generator 77 of the server 7 generates a message indicating to the user the cancellation of a ride into the target vehicle and transmits, to the terminal apparatus 3, information of the message indicating the cancellation of a ride into the target vehicle (S16).

Next, the display 39 of the terminal apparatus 3 receives the information of the message indicating the cancellation of a ride into the target vehicle to the user and displays the message indicating that the cancellation of a ride into the target vehicle (S4). Then, the dispatch system 200 ends this flow.

It should be noted that Embodiment 2 is the same in other working effects as Embodiment 1 and the like.

Embodiment 3

The following describes a dispatch system 200 according to Embodiment 3.

Figure 9:
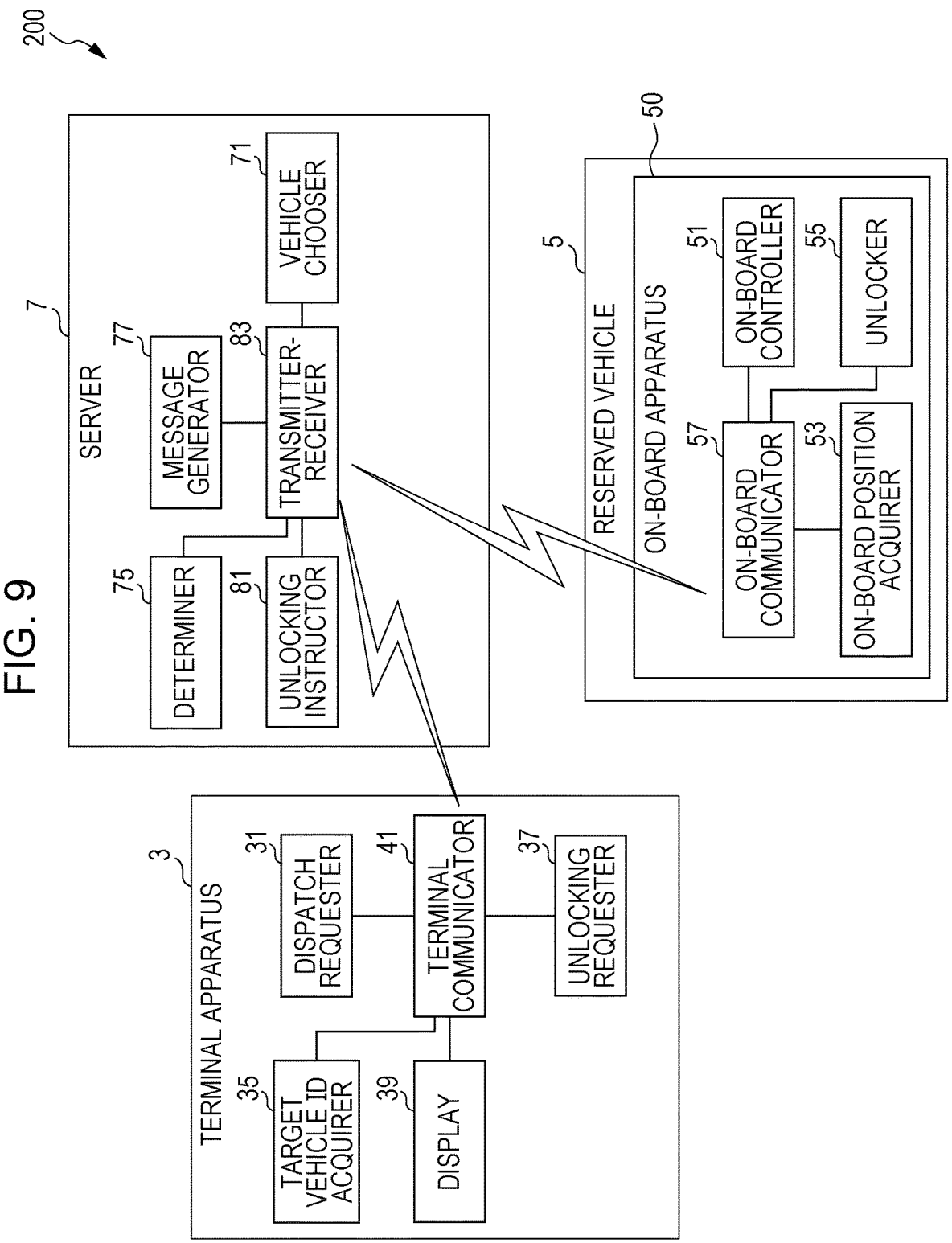
FIG. 9 is a block diagram showing a dispatch system according to Embodiment 3.

FIG. 9 is a block diagram showing the dispatch system 200 according to Embodiment 3.

Embodiment 3 differs from Embodiments 1 and 2 in that the terminal apparatus 3 of the dispatch system 200 does not have a terminal position acquirer 33 such as that of Embodiment 1 shown in FIG. 2. The dispatch system according to Embodiment 3 is the same as those of Embodiments 1 and 2 unless otherwise noted, and identical components are given identical signs and are not described in detail below.

Operation

The following describes an operation of the dispatch system 200 according to Embodiment 3.

Figure 10:
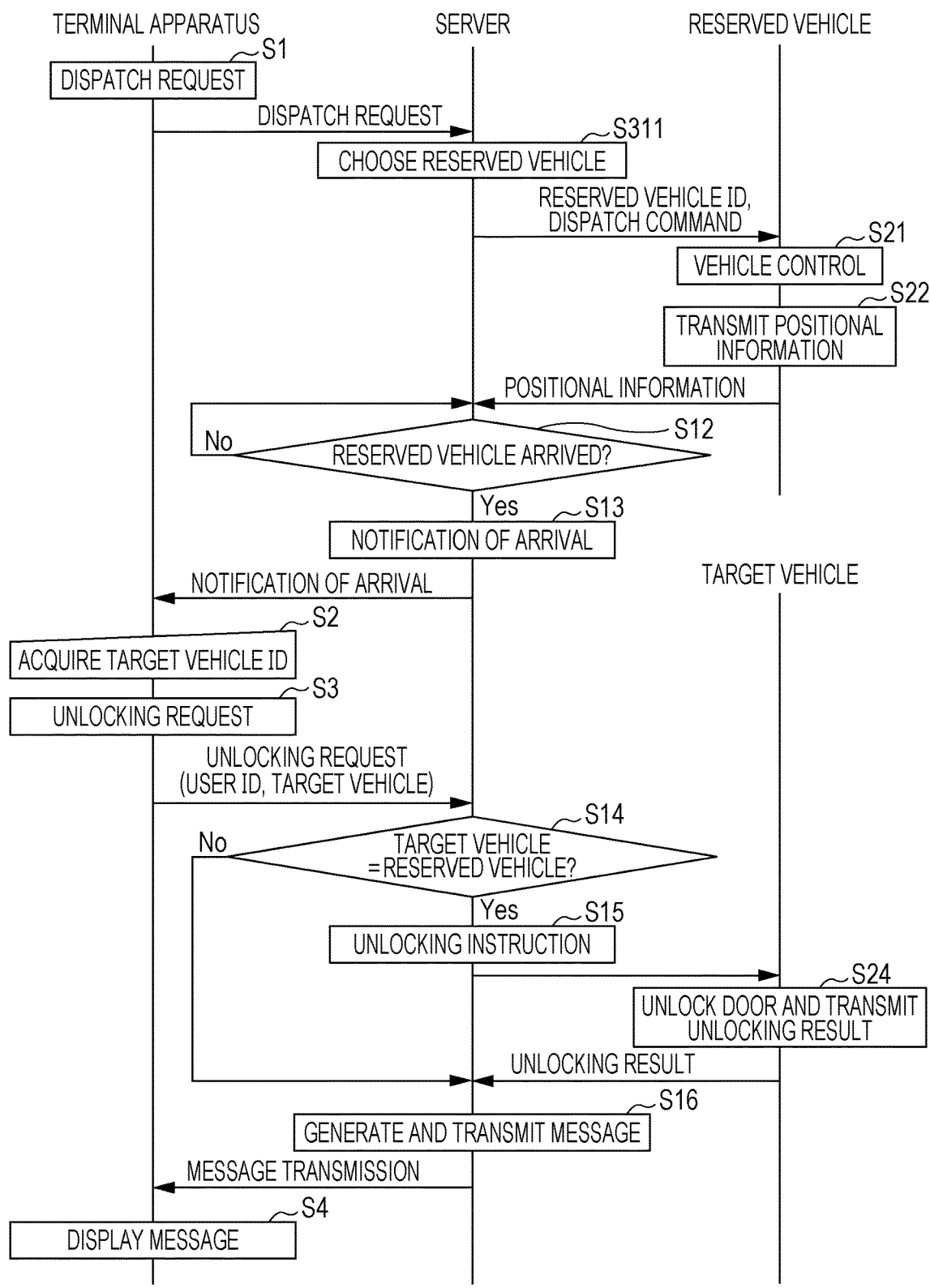
FIG. 10 is a sequence diagram showing an operation of the dispatch system according to Embodiment 3.

FIG. 10 is a sequence diagram showing an operation of the dispatch system 200 according to Embodiment 3.

Embodiment 3 differs from Embodiment 2 in that in step S3 of Embodiment 2 shown in FIG. 8, Embodiment 3 does not transmit the positional information of the terminal apparatus 3. In other respects, the same process is performed; therefore, Embodiment 3 omits to describe a process which is the same as that shown in FIG. 8.

As shown in FIGS. 9 and 10, the dispatch requester 31 of the terminal apparatus 3 makes a dispatch request to the server 7 via the terminal communicator 41 (S1).

Next, the server 7 receives the dispatch request and chooses which reserved vehicle 5 to dispatch to the user (S311).

Next, the on-board communicator 51 of the reserved vehicle 5 controls the actuator of the reserved vehicle 5 in accordance with the dispatch command so that the reserved vehicle 5 travels to the designated place (S21).

Next, the on-board position acquirer 53 of the reserved vehicle 5 receives the positional information of the reserved vehicle 5 by means of a function such as a GPS and transmits the positional information of the reserved vehicle 5 to the server 7 (S22).

Next, the determiner 75 of the server 7 determines whether the reserved vehicle 5 has arrived at the place designated by the user (S12). In a case where the determiner 75 has determined that the reserved vehicle 5 has not arrived at the place designated by the user (No in S12), the determiner 75 makes the same determination until the reserved vehicle 5 arrives at the designated place.

In a case where the determiner 75 has determined that the reserved vehicle 5 has arrived at the place designated by the user (Yes in S12), the determiner 75 transmits, to the terminal apparatus 3, a notification of arrival indicating that the reserved vehicle 5 has arrived (S13).

Next, the target vehicle ID acquirer 35 acquires a target vehicle ID, held by the target vehicle, that is used to identify whether the target vehicle is the reserved vehicle 5 (S2).

Next, the terminal apparatus 3 stores the target vehicle ID in the storage such as a memory and makes an unlocking request to the server 7 for unlocking of the door of the reserved vehicle 5 (S3). Specifically, the terminal apparatus 3 transmits, to the server 7, an unlocking request containing the user ID, the target vehicle ID, and the like (S3).

Next, upon receiving the unlocking request from the terminal apparatus 3, the determiner 75 of the server 7 determines whether the target vehicle is the reserved vehicle 5 (S14).

In a case where the determiner 75 has determined that the target vehicle is the reserved vehicle 5 (Yes in S14), the unlocking instructor 81 of the terminal apparatus 3 transmits, to the reserved vehicle 5, an unlocking instruction to unlock the door of the reserved vehicle 5 (S15).

Next, upon receiving the unlocking instruction, the unlocker 55 of the reserved vehicle 5 unlocks the door of the reserved vehicle 5 (S24). Then, the unlocker 55 transmits, to the server 7, information indicating an unlocking result of having unlocked the door of the reserved vehicle 5 (S24).

Next, the message generator 77 of the server 7 generates a message and transmits it to the terminal apparatus 3 (S16).

Next, the display 39 of the terminal apparatus 3 receives the information of the message indicating to the user that the user may get on the target vehicle and displays the message indicating that the user may get on the target vehicle (S4). Then, the dispatch system 200 ends this flow.

On the other hand, in a case where the determiner 75 has determined that the target vehicle is not the reserved vehicle 5 (No in S14), the message generator 77 of the server 7 generates a message indicating to the user the cancellation of a ride into the target vehicle and transmits, to the terminal apparatus 3, information of the message indicating the cancellation of a ride into the target vehicle (S16).

Next, the display 39 of the terminal apparatus 3 receives the information of the message indicating the cancellation of a ride into the target vehicle to the user and displays the message indicating that the cancellation of a ride into the target vehicle (S4). Then, the dispatch system 200 ends this flow.

Figure 11:
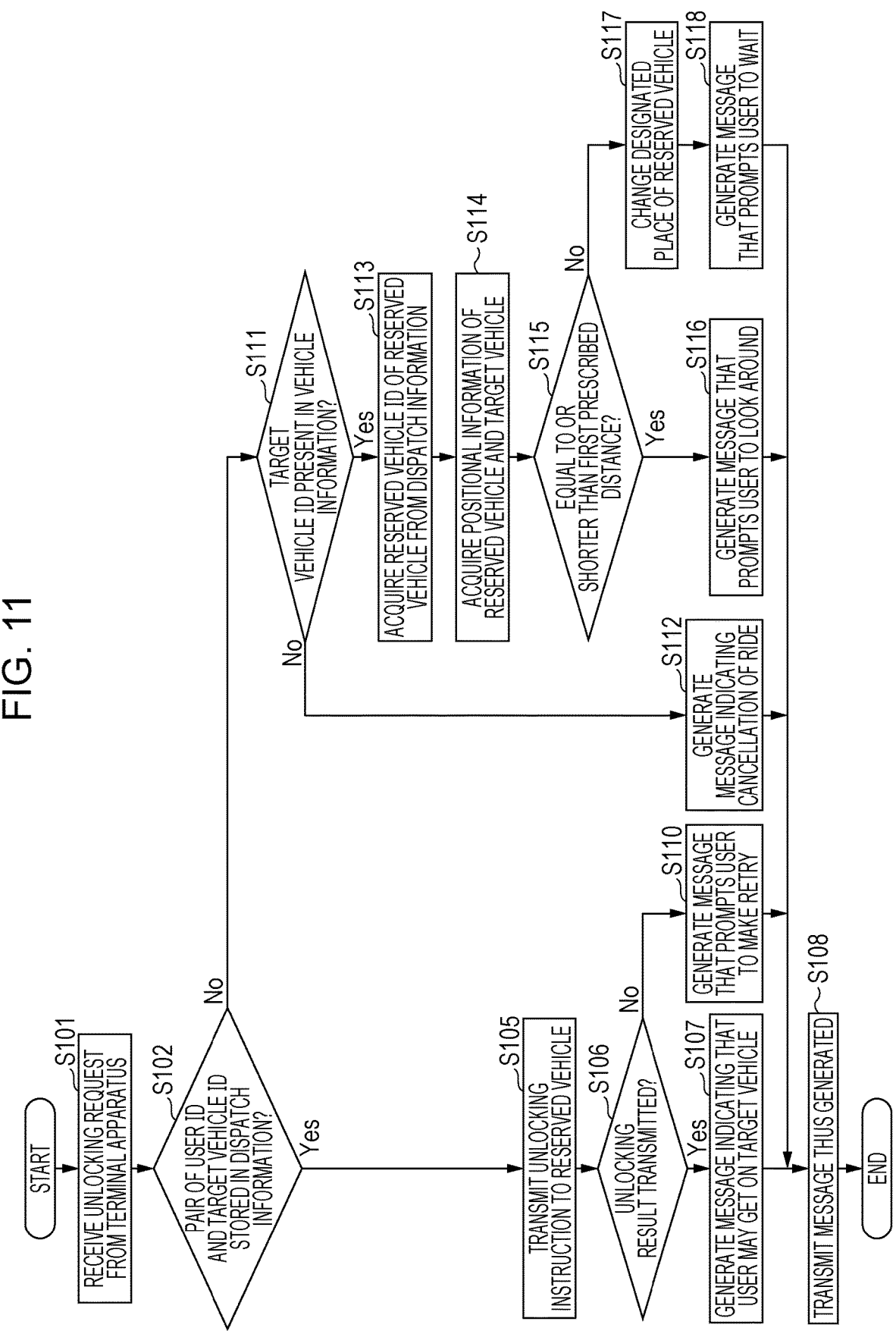
FIG. 11 is a flow chart showing an operation in a server of the dispatch system according to Embodiment 3.

FIG. 11 is a flow chart showing an operation in the server 7 of the dispatch system 200 according to Embodiment 3.

Embodiment 3 differs from Embodiment 1 in that Embodiment 3 is not provided with steps S103 and S104 of Embodiment 1 shown in FIG. 5. In other respects, the same process is performed; therefore, Embodiment 3 omits to describe a process which is the same as that shown in FIG. 5.

As shown in FIGS. 9 and 11, first, when the terminal apparatus 3 makes an unlocking request to the server 7, the server 7 receives the unlocking request from the terminal apparatus 3 (S101).

Next, the determiner 75 determines whether a pair of the user ID and the target vehicle ID is stored in the dispatch information that the server 7 has (S102).

Having determined that the pair of the user ID and the target vehicle ID is stored in the dispatch information (Yes in S102), the determiner 75 transmits an unlocking instruction to the reserved vehicle 5 (S105).

Next, after the unlocker 55 of the reserved vehicle 5 has unlocked the door of the reserved vehicle 5, the determiner 75 determines whether information, transmitted from the reserved vehicle 5, that indicates an unlocking result of having unlocked the door of the reserved vehicle 5 has been received (S106).

In a case where the determiner 75 has determined that information indicating an unlocking result has been received from the reserved vehicle 5 (Yes in S106), the message generator 77 of the server 7 generates a message indicating to the user that the user may get on the target vehicle (S107) and transmits, to the terminal apparatus 3, information of the message indicating that the user may get on the target vehicle (S108). Then, the dispatch system 200 ends this flow.

On the other hand, in a case where the determiner 75 has determined in step S106 that information indicating an unlocking result has not been received (No in S106), the message generator 77 of the server 7 generates a message that prompts the user to make a retry (S110), and transmits, to the terminal apparatus 3, information of the message that prompts the user to make a retry (S108).

On the other hand, having determined in step S102 that the pair of the user ID and the target vehicle ID is not stored in the dispatch information (No in S102), the determiner 75 determines whether the target vehicle ID is contained in the vehicle information (S111).

In a case where the determiner 75 has determined that the target vehicle ID is not present in the vehicle information (No in S111), the message generator 77 of the server 7 generates a message indicating the cancellation of a ride into the target vehicle so that the user does not get on the target vehicle that is at the user's side (S112). Then, the dispatch system 200 ends this flow after executing step S108.

In a case where the determiner 75 has determined that the target vehicle ID is contained in the vehicle information (Yes in S111), the determiner 75 acquires the reserved vehicle ID of the reserved vehicle 5 from the dispatch information (S113).

Next, the determiner 75 acquires the positional information of the reserved vehicle 5 from the reserved vehicle 5 and the positional information of the target vehicle from the terminal apparatus 3 (S114).

Next, the determiner 75 determines whether the distance between the position indicated by the positional information of the reserved vehicle 5 and the position indicated by the positional information of the target vehicle is equal to or shorter than the first prescribed distance (S115).

When the determiner 75 determines that the distance between the position indicated by the positional information of the reserved vehicle 5 and the position indicated by the positional information of the target vehicle is equal to or shorter than the first prescribed distance (Yes in S115), the message generator 77 of the server 7 generates a message that prompts the user to look around (S116). Then, the dispatch system 200 ends this flow after executing step S108.

Having determined that the distance between the position indicated by the positional information of the reserved vehicle 5 and the position indicated by the positional information of the target vehicle is longer than the first prescribed distance (No in S115), the determiner 75 changes the designated place of the reserved vehicle 5 (S117). The message generator 77 generates a message that prompts the user to wait (S118). Then, the dispatch system 200 ends this flow after executing step S108.

It should be noted that Embodiment 3 is the same in other working effects as Embodiment 1.

Embodiment 4

The following describes a dispatch system according to Embodiment 4.

Embodiment 4 differs from Embodiments 1 to 3 in that the server 7 does not generate a message that prompts the user to wait. A configuration of the dispatch system according to Embodiment 4 is the same in other respects as those of Embodiments 1 to 3, and identical components are given identical signs and are not described in detail below.

Operation

The following describes an operation of the dispatch system according to Embodiment 4.

Figure 12:
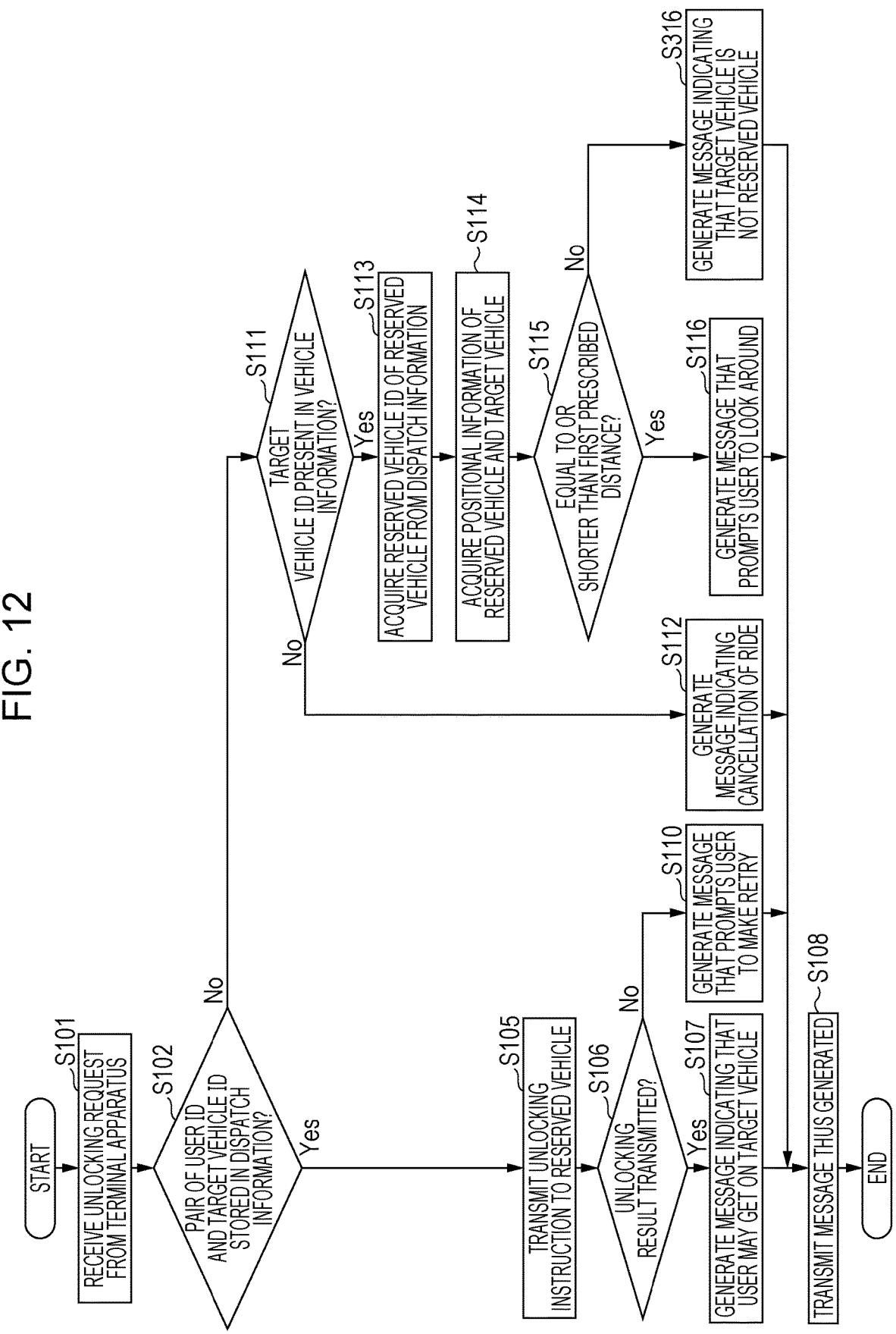
FIG. 12 is a flow chart showing an operation in a server of a dispatch system according to Embodiment 4.

FIG. 12 is a flow chart showing an operation in the server 7 of the dispatch system according to Embodiment 4.

Embodiment 4 differs from Embodiment 3 in that Embodiment 4 is not provided with steps S117 and S118 of Embodiment 3 shown in FIG. 11. In other respects, the same process is performed; therefore, Embodiment 4 omits to describe a process which is the same as that shown in FIG. 11.

As shown in FIGS. 9 and 12, first, when the terminal apparatus 3 makes an unlocking request to the server 7, the server 7 receives the unlocking request from the terminal apparatus 3 (S101).

Next, the determiner 75 determines whether a pair of the user ID and the target vehicle ID is stored in the dispatch information that the server 7 has (S102).

Having determined that the pair of the user ID and the target vehicle ID is stored in the dispatch information (Yes in S102), the determiner 75 transmits an unlocking instruction to the reserved vehicle 5 (S105).

Next, after the unlocker 55 of the reserved vehicle 5 has unlocked the door of the reserved vehicle 5, the determiner 75 determines whether information, transmitted from the reserved vehicle 5, that indicates an unlocking result of having unlocked the door of the reserved vehicle 5 has been received (S106).

In a case where the determiner 75 has determined that information indicating an unlocking result has been received from the reserved vehicle 5 (Yes in S106), the message generator 77 of the server 7 generates a message indicating to the user that the user may get on the target vehicle (S107) and transmits, to the terminal apparatus 3, information of the message indicating that the user may get on the target vehicle (S108). Then, the dispatch system ends this flow.

On the other hand, in a case where the determiner 75 has determined in step S106 that information indicating an unlocking result has not been received (No in S106), the message generator 77 of the server 7 generates a message that prompts the user to make a retry (S110), and transmits, to the terminal apparatus 3, information of the message that prompts the user to make a retry (S108).

On the other hand, having determined in step S102 that the pair of the user ID and the target vehicle ID is not stored in the dispatch information (No in S102), the determiner 75 determines whether the target vehicle ID is contained in the vehicle information (S111).

In a case where the determiner 75 has determined that the target vehicle ID is not present in the vehicle information (No in S111), the message generator 77 of the server 7 generates a message indicating the cancellation of a ride into the target vehicle so that the user does not get on the target vehicle that is at the user's side (S112). Then, the dispatch system ends this flow after executing step S108.

In a case where the determiner 75 has determined that the target vehicle ID is contained in the vehicle information (Yes in S111), the determiner 75 acquires the reserved vehicle ID of the reserved vehicle 5 from the dispatch information (S113).

Next, the determiner 75 acquires the positional information of the reserved vehicle 5 from the reserved vehicle 5 and the positional information of the target vehicle from the terminal apparatus 3 (S114).

Next, the determiner 75 determines whether the distance between the position indicated by the positional information of the reserved vehicle 5 and the position indicated by the positional information of the target vehicle is equal to or shorter than the first prescribed distance (S115).

When the determiner 75 determines that the distance between the position indicated by the positional information of the reserved vehicle 5 and the position indicated by the positional information of the target vehicle is equal to or shorter than the first prescribed distance (Yes in S115), the message generator 77 of the server 7 generates a message that prompts the user to look around (S116). Then, the dispatch system ends this flow after executing step S108.

Having determined that the distance between the position indicated by the positional information of the reserved vehicle 5 and the position indicated by the positional information of the target vehicle is longer than the first prescribed distance (No in S115), the message generator 77 of the server 7 generates a message indicating that the target vehicle is not the reserved vehicle 5 (S316). For example, it is conceivable that the target vehicle may be a reserved vehicle, included in the vehicles that the server 7 manages, that another user has reserved. For example, the message indicating that the target vehicle is not the reserved vehicle 5 is "This vehicle is not the vehicle you have reserved. You are not allowed to get on", which is shown in FIG. 6B, or the like. Then, the dispatch system ends this flow after executing step S108.

It should be noted that Embodiment 4 is the same in other working effects as Embodiment 1 and the like.

Embodiment 5

The following describes a dispatch system according to Embodiment 5.

Embodiment 5 differs from Embodiments 1 to 4 in that the server 7 does not determine whether the distance between the position indicated by the positional information of the reserved vehicle 5 and the position indicated by the positional information of the target vehicle is equal to or shorter than the first prescribed distance. A configuration of the dispatch system according to Embodiment 5 is the same in other respects as those of Embodiments 1 to 4, and identical components are given identical signs and are not described in detail below.

Operation

The following describes an operation of the dispatch system according to Embodiment 5.

Figure 13:
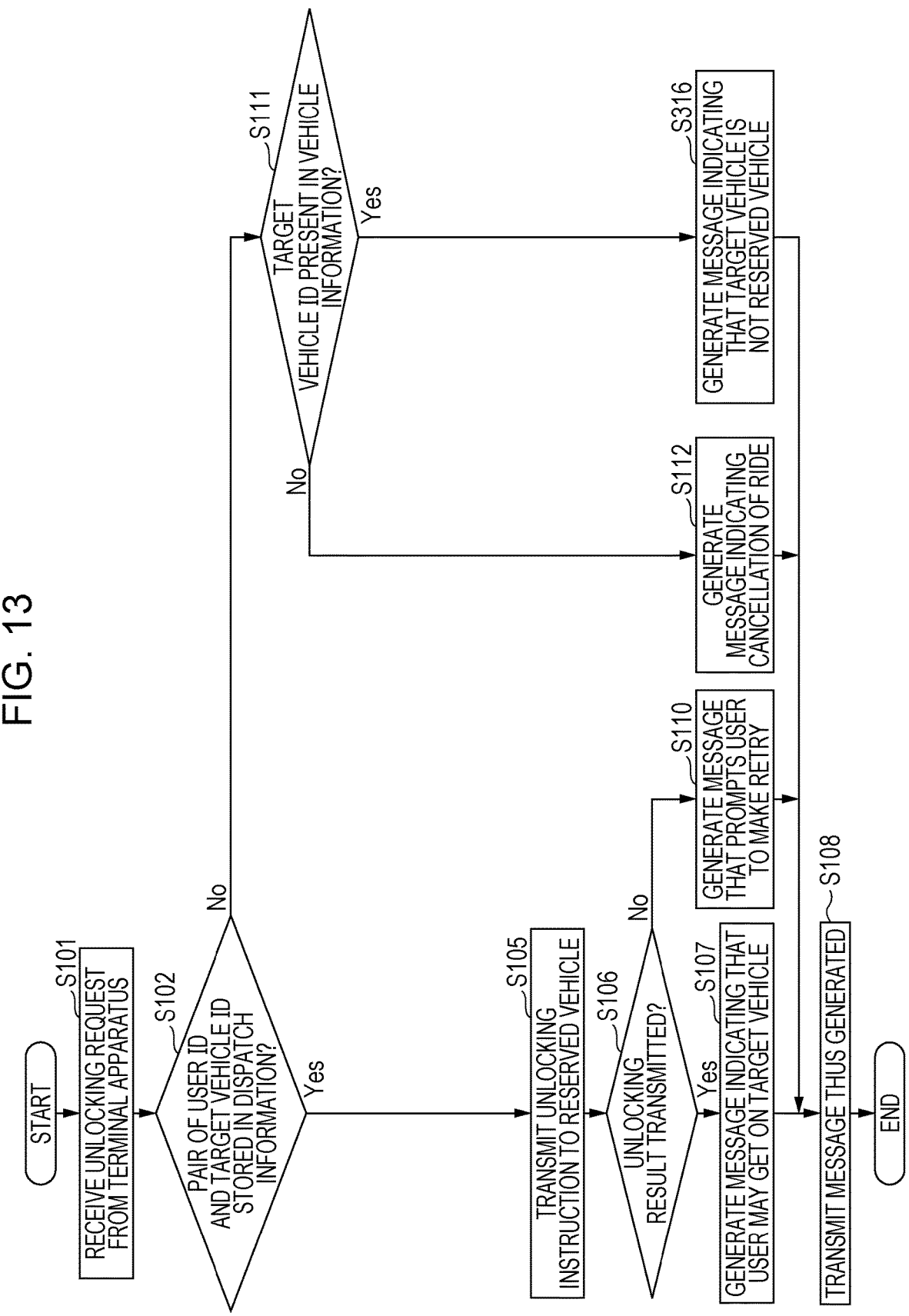
FIG. 13 is a flow chart showing an operation in a server of a dispatch system according to Embodiment 5.

FIG. 13 is a flow chart showing an operation in the server 7 of the dispatch system according to Embodiment 5.

Embodiment 5 differs from Embodiment 4 in that Embodiment 5 is not provided with steps S113 to S115 of Embodiment 4 shown in FIG. 12. In other respects, the same process is performed; therefore, Embodiment 5 omits to describe a process which is the same as that shown in FIG. 12.

As shown in FIGS. 9 and 13, first, when the terminal apparatus 3 makes an unlocking request to the server 7, the server 7 receives the unlocking request from the terminal apparatus 3 (S101).

Next, the determiner 75 determines whether a pair of the user ID and the target vehicle ID is stored in the dispatch information that the server 7 has (S102).

Having determined that the pair of the user ID and the target vehicle ID is stored in the dispatch information (Yes in S102), the determiner 75 transmits an unlocking instruction to the reserved vehicle 5 (S105).

Next, after the unlocker 55 of the reserved vehicle 5 has unlocked the door of the reserved vehicle 5, the determiner 75 determines whether information, transmitted from the reserved vehicle 5, that indicates an unlocking result of having unlocked the door of the reserved vehicle 5 has been received (S106).

In a case where the determiner 75 has determined that information indicating an unlocking result has been received from the reserved vehicle 5 (Yes in S106), the message generator 77 of the server 7 generates a message indicating to the user that the user may get on the target vehicle (S107) and transmits, to the terminal apparatus 3, information of the message indicating that the user may get on the target vehicle (S108). Then, the dispatch system ends this flow.

On the other hand, in a case where the determiner 75 has determined in step S106 that information indicating an unlocking result has not been received (No in S106), the message generator 77 of the server 7 generates a message that prompts the user to make a retry (S110), and transmits, to the terminal apparatus 3, information of the message that prompts the user to make a retry (S108).

On the other hand, having determined in step S102 that the pair of the user ID and the target vehicle ID is not stored in the dispatch information (No in S102), the determiner 75 determines whether the target vehicle ID is contained in the vehicle information (S111).

In a case where the determiner 75 has determined that the target vehicle ID is not present in the vehicle information (No in S111), the message generator 77 of the server 7 generates a message indicating the cancellation of a ride into the target vehicle so that the user does not get on the target vehicle that is at the user's side (S112). Then, the dispatch system ends this flow after executing step S108.

In a case where the determiner 75 has determined that the target vehicle ID is contained in the vehicle information (Yes in S111), the message generator 77 of the server 7 generates a message indicating that the target vehicle is not the reserved vehicle 5 (S316). For example, it is conceivable that the target vehicle may be a reserved vehicle, included in the vehicles that the server 7 manages, that another user has reserved. For example, the message indicating that the target vehicle is not the reserved vehicle 5 is "This vehicle is not the vehicle you have reserved. You are not allowed to get on", which is shown in FIG. 6B, or the like. Then, the dispatch system ends this flow.

It should be noted that Embodiment 5 is the same in other working effects as Embodiment 1 and the like.

Embodiment 6

The following describes a dispatch system according to Embodiment 6.

Embodiment 6 differs from Embodiments 1 to 5 in that the server 7 does not determine whether the target vehicle ID is contained in the vehicle information. A configuration of the dispatch system according to Embodiment 6 is the same in other respects as those of Embodiments 1 to 5, and identical components are given identical signs and are not described in detail below.

Operation

The following describes an operation of the dispatch system according to Embodiment 6.

Figure 14:
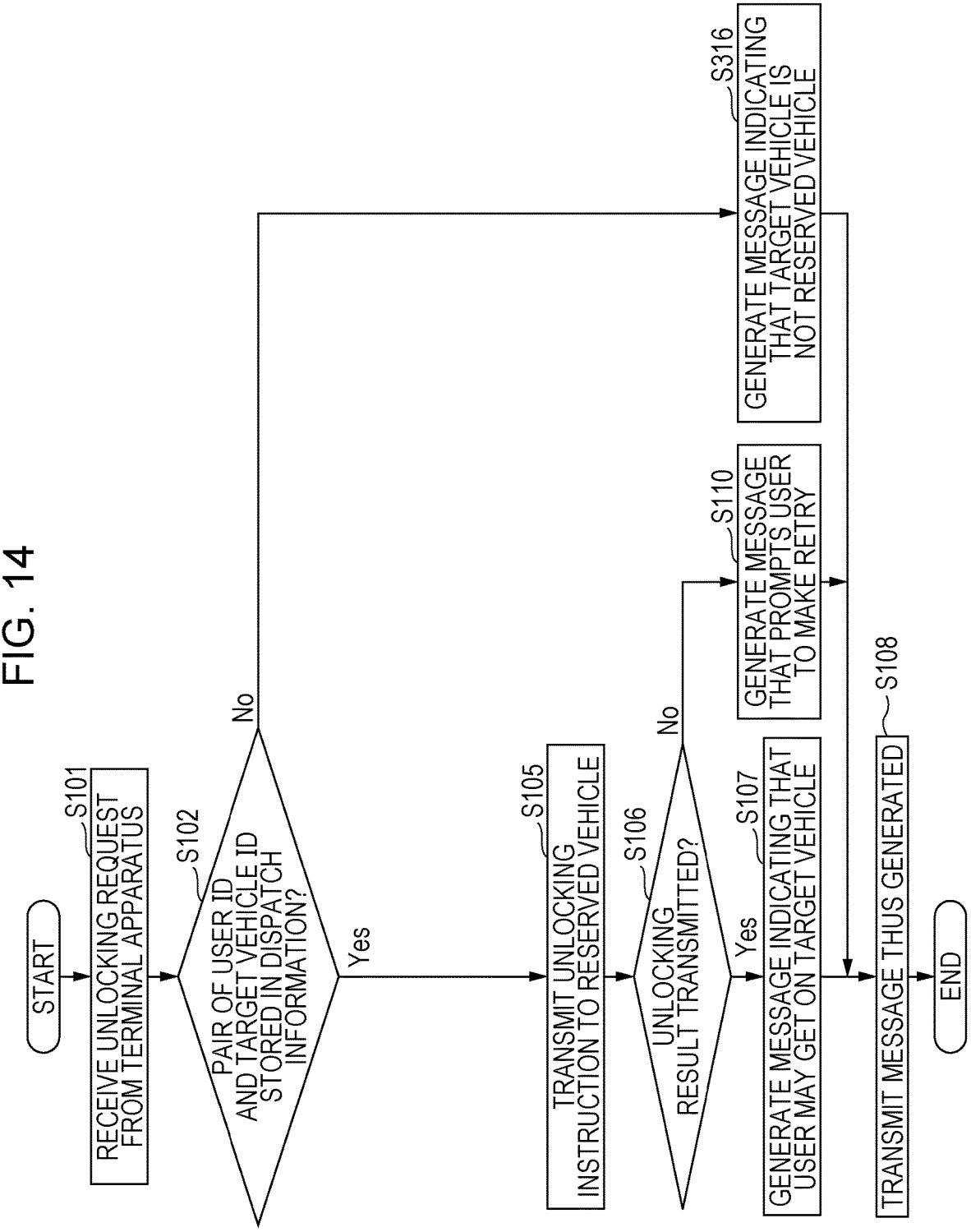
FIG. 14 is a flow chart showing an operation in a server of a dispatch system according to Embodiment 6.

FIG. 14 is a flow chart showing an operation in the server 7 of the dispatch system according to Embodiment 6.

Embodiment 6 differs from Embodiment 5 in that Embodiment 6 is not provided with steps S111 and S112 of Embodiment 5 shown in FIG. 13. In other respects, the same process is performed; therefore, Embodiment 6 omits to describe a process which is the same as that shown in FIG. 13.

As shown in FIGS. 9 and 14, first, when the terminal apparatus 3 makes an unlocking request to the server 7, the server 7 receives the unlocking request from the terminal apparatus 3 (S101).

Next, the determiner 75 determines whether a pair of the user ID and the target vehicle ID is stored in the dispatch information that the server 7 has (S102).

Having determined that the pair of the user ID and the target vehicle ID is stored in the dispatch information (Yes in S102), the determiner 75 transmits an unlocking instruction to the reserved vehicle 5 (S105).

Next, after the unlocker 55 of the reserved vehicle 5 has unlocked the door of the reserved vehicle 5, the determiner 75 determines whether information, transmitted from the reserved vehicle 5, that indicates an unlocking result of having unlocked the door of the reserved vehicle 5 has been received (S106).

In a case where the determiner 75 has determined that information indicating an unlocking result has been received from the reserved vehicle 5 (Yes in S106), the message generator 77 of the server 7 generates a message indicating to the user that the user may get on the target vehicle (S107) and transmits, to the terminal apparatus 3, information of the message indicating that the user may get on the target vehicle (S108). Then, the dispatch system ends this flow.

On the other hand, in a case where the determiner 75 has determined in step S106 that information indicating an unlocking result has not been received (No in S106), the message generator 77 of the server 7 generates a message that prompts the user to make a retry (S110), and transmits, to the terminal apparatus 3, information of the message that prompts the user to make a retry (S108).

On the other hand, having determined in step S102 that the pair of the user ID and the target vehicle ID is not stored in the dispatch information (No in S102), the message generator 77 of the server 7 generates a message indicating that the target vehicle is not the reserved vehicle 5 (S316). Then, the dispatch system ends this flow after executing step S108.

In a case where the determiner 75 has determined that the target vehicle ID is contained in the vehicle information (Yes in S111), the message generator 77 of the server 7 generates a message indicating that the target vehicle is not the reserved vehicle 5 (S316). For example, it is conceivable that the target vehicle may be a reserved vehicle, included in the vehicles that the server 7 manages, that another user has reserved. For example, the message indicating that the target vehicle is not the reserved vehicle 5 is "This vehicle is not the vehicle you have reserved. You are not allowed to get on", which is shown in FIG. 6B, or the like. Then, the dispatch system ends this flow.

It should be noted that Embodiment 6 is the same in other working effects as Embodiment 1 and the like.

Other Modifications

Although the foregoing has described the authentication methods, the programs, the servers, and the dispatch systems according to Embodiments 1 to 6 of the present disclosure, Embodiments 1 to 6 of the present disclosure are not limited to the aforementioned embodiments.

For example, in the case of a possibility of a malicious vehicle in the authentication methods, the programs, the servers, and the dispatch systems according to Embodiments 1 to 6 of the present disclosure, it is possible not only to make a display on the display of a terminal apparatus but also to report the presence of the malicious vehicle to an external public institution.

The processors included in the authentication methods, the programs, the servers, and the dispatch systems according to Embodiments 1 to 6 of the present disclosure are realized as LSIs typified by integrated circuits. These LSIs may be individually integrated into one chip, or may be integrated into one chip including some or all of them.

Further, the implementation of an integrated circuit is not limited to the LSI and may be realized by using a dedicated circuit or a general-purpose processor. An FPGA (field-programmable gate array) that can be programmed after the manufacture of the LSI or a reconfigurable processor in which the connections and the settings of circuit cells disposed inside the LSI can be reconfigured may be used.

In each of the embodiments described above, each constituent element may be configured by dedicated hardware, or may be realized by executing a software program suited to that constituent element. Each constituent element may be realized by a program executor such as a CPU or a processor reading out a software program stored on a storage medium such as a hard disk or a semiconductor memory.

Further, the numbers used above are all given as examples to describe the present disclosure in concrete terms, and the embodiments of the present disclosure are not limited to the numbers given as examples.

For example, the division of functional blocks in a block diagram is merely an example. A plurality of functional blocks may be realized as one functional block. One functional block may be divided into a plurality of functional blocks. Some functions may be transferred to other functional blocks. Further, the functions of a plurality of functional blocks having similar functions may be processed in parallel or in a time-division manner by a single piece of hardware or software.

Further, the order of execution of steps in a flow chart is intended for illustrative purposes of describing the present disclosure in concrete terms, and the foregoing orders may be changed. Further, some of the steps may be executed at the same time as (in parallel with) other steps.

Although the foregoing has described authentication methods, programs, servers, and dispatch systems according to one more aspects with reference to Embodiments 1 to 6, Embodiments 1 to 6 of the present disclosure are not limited to the plurality of aspects. Embodiments based on the application to Embodiments 1 to 6 of various modifications conceived of by persons skilled in the art and embodiments based on combinations of some constituent elements of different embodiments are encompassed in the scope of the one or more aspects, provided such embodiments do not depart from the spirit of the present disclosure.

What is claimed is:

1. A method for authentication in a dispatch system, comprising:
   receiving, from a terminal of a user, a dispatch request for a target vehicle;
   matching, based on a user ID for identifying the user, a target vehicle ID for identifying the target vehicle for the user based on the dispatch request made by the user from the terminal of the user;
   receiving, from the target vehicle, positional information of the target vehicle and transmitting the positional information of the target vehicle to a server;
   receiving, from the terminal of the user, the user ID for identifying the user and the target vehicle ID for identifying the target vehicle that the user tries to authenticate;
   determining by a determiner, with reference to dispatch information and the positional information of the target vehicle, whether the target vehicle ID matches a reserved vehicle ID for identifying a reserved vehicle whose dispatch has been reserved by the user, wherein, in the dispatch information, a plurality of reserved vehicle IDs for identifying reserved vehicles whose dispatches have been reserved are in association with a plurality of user IDs for identifying users who have reserved vehicle dispatches, respectively;
   when the determiner determines that the target vehicle ID matches the reserved vehicle ID based on at least the positional information of the target vehicle, transmitting, to the target vehicle, an unlocking instruction from a server to unlock an electrical lock locking a door of the target vehicle, causing a mechanical driver to unlock the electrical lock upon receiving the unlocking instruction from the server, and causing the terminal to present a message indicating that the user is allowed to get on the target vehicle;
   when the determiner determines that the target vehicle ID does not match the reserved vehicle ID based on at least the positional information of the target vehicle, causing the terminal to present a message indicating that the target vehicle is not the reserved vehicle of the user and a message indicating that the target vehicle is arriving within a certain period of time; and
   when the determiner determines that the target vehicle ID matches the reserved vehicle ID and in a case where a distance between the terminal and the reserved vehicle is not equal to or not shorter than a predefined distance based on at least the positional information of the target vehicle, causing the server to transmit a message to the terminal indicating that the target vehicle is a malicious vehicle, and causing the terminal to present a message indicating cancellation of a ride into the target vehicle, and
   in a case where the target vehicle ID matches any one of a plurality of managed vehicle IDs, receiving, after a determination that the target vehicle ID matches any one of the plurality of managed vehicle IDs, from the reserved vehicle of the user, first positional information indicating a position of the reserved vehicle;
   receiving, from the target vehicle, second positional information indicating a position of the target vehicle;
   determining, based on the first positional information and the second positional information, whether a distance between the reserved vehicle and the target vehicle is equal to or shorter than a first distance; and
   in a case where the distance between the reserved vehicle and the target vehicle is equal to or shorter than the first distance, causing the terminal to present a message that prompts the user to look around, and the message contains an indication that the target vehicle is not the reserved vehicle, and provides location information regarding the location of the reserved vehicle.

2. The method according to claim 1, further comprising:
   in a case where the target vehicle ID does not match the reserved vehicle ID based on at least the positional information of the target vehicle, determining, with reference to vehicle information, whether the target vehicle ID matches any one of the plurality of managed vehicle IDs, wherein the vehicle information includes a plurality of managed vehicle IDs for identifying individual managed vehicles that the dispatch system manages; and
   in a case where the target vehicle ID does not match any one of the plurality of managed vehicle IDs, causing the terminal to present a message that prompts the user not to get on the target vehicle.

3. The method according to claim 1, further comprising:
   in a case where the distance between the reserved vehicle and the target vehicle is not equal to or shorter than the first distance, changing, to the position indicated by the second positional information, a position to which the reserved vehicle is dispatched and causing the terminal to present a message that prompts the user to wait.

4. The method according to claim 1, further comprising:
   in a case where the target vehicle ID matches the reserved vehicle ID, receiving third positional information indicating a position of the terminal;
   determining, based on the third positional information and the positional information, whether a distance between the terminal and the reserved vehicle is equal to or shorter than a second distance; and
   in a case where the distance between the terminal and the reserved vehicle is not equal to or shorter than the second distance, causing the terminal to present a message that prompts the user not to get on the target vehicle.

5. The method according to claim 1, further comprising:
   generating a new reserved vehicle ID after the user has used the target vehicle and when a new user newly reserves a dispatch of the target vehicle; and
   based on the new reserved vehicle ID, causing the target vehicle to update the target vehicle ID.

6. The method according to claim 1, further comprising:
   after the user has used the target vehicle and by a time that a new user newly reserves a dispatch of the target vehicle, causing the target vehicle to update the target vehicle ID; and
   when the new user newly reserves a dispatch of the target vehicle, generating a new reserved vehicle ID based on the target vehicle ID thus updated.

7. A non-transitory storage medium that causes a computer to execute the authentication method according to claim 1.

8. A server comprising:
- a processor; and
- a memory having stored therein a program for causing the processor to execute the authentication method according to claim 1.

9. A dispatch system comprising:
- the server according to claim 8;
- the terminal; and
- the reserved vehicle.

* * * * *